US012715424B2

(12) United States Patent
Whitney et al.

(10) Patent No.: US 12,715,424 B2
(45) Date of Patent: Aug. 25, 2026

(54) INDEPENDENT WHEEL HYBRID OPTIMIZATION

(71) Applicant: SAUDI ARABIAN OIL COMPANY, Dhahran (SA)

(72) Inventors: Christopher Whitney, Commerce, MI (US); Rafael Lago Sari, Commerce Township, MI (US); Manuel A. Echeverri Marquez, Farmington Hills, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 22 days.

(21) Appl. No.: 19/034,274

(22) Filed: Jan. 22, 2025

(65) Prior Publication Data

US 2026/0208721 A1 Jul. 23, 2026

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *B60W 10/26* (2013.01);
(Continued)

(58) Field of Classification Search
CPC ...... B60W 20/15; B60W 10/06; B60W 10/08; B60W 10/26; B60W 10/115; B60W 10/16;
(Continued)

(56) References Cited

U.S. PATENT DOCUMENTS 5,120,282 A 6/1992 Fjallstrom
8,640,801 B2 2/2014 Hennings et al.
(Continued)

FOREIGN PATENT DOCUMENTS

CN 109635484 A 4/2019
CN 115257697 A 11/2022
(Continued)

OTHER PUBLICATIONS

Wang, Rui et al., "Dynamic programming technique in hybrid electric vehicle optimization." 2012 IEEE international electric vehicle conference. IEEE, 2012 (8 pages).
(Continued)

*Primary Examiner* — Steven Vu Nguyen
(74) *Attorney, Agent, or Firm* — Osha Bergman Watanabe & Burton LLP

(57) ABSTRACT

A vehicle includes a crankshaft, motors, generators, a battery, epicyclic geartrains, and an Electronic Control Unit (ECU). A first epicyclic geartrain is positioned on the first side of the vehicle and transmits power from at least one of the first motor, the first generator, and the crankshaft to a first wheel assembly. A second epicyclic geartrain is positioned on the second side of the vehicle and transmits power from at least one of the second motor, the second generator, and the crankshaft to a second wheel assembly. The ECU receives operating constraints associated with the motors, the generators, and the crankshaft, and proceeds to determine global and local engine operating cases associated with desired operating parameters for the components of the vehicle. Subsequently, the ECU selects a desired engine operating case and controls the motors, the generators, and parameters of the combustion reaction based upon the selected engine operating case.

20 Claims, 8 Drawing Sheets

Start
705 Determine wheel torque and power for each side of the vehicle
710 Receive component operating constraints
Global Search 167
715 Determine engine cases for a global search window
720 Calculate the first and second generator torque and speed for each engine on operating case using planetary gearset equations
725 Determine supplemental power produced by the first and second motors for each engine case
730 Determine power losses associated with fuel consumption, battery usage, and parasitic losses
735 Calculate the first and second motor power for an engine off operating case, and determine battery power loss for the engine off operating case
740 Select the optimal global search operating case
Local Search 169
745 Determine engine cases for a local search window
750 Calculate the first and second generator torque and speed for each engine on operating case using planetary gearset equations
755 Determine supplemental power produced by the first and second motors for each engine case
760 Determine power losses associated with fuel consumption, battery usage, and parasitic losses
765 Calculate the first and second motor power for an engine off operating case, and determine battery power loss for the engine off operating case
770 Determine power losses associated with fuel consumption, battery usage, and parasitic losses
775 Control the operation of the first and second motors, the first and second generators, and parameters of the combustion reaction based upon the selected operating case
End

(51) Int. Cl.
*B60W 10/08* (2006.01)
*B60W 10/115* (2012.01)
*B60W 10/16* (2012.01)
*B60W 10/26* (2006.01)

(52) U.S. Cl.
CPC .......... *B60W 10/115* (2013.01); *B60W 10/16* (2013.01); *B60W 2510/0638* (2013.01); *B60W 2510/0666* (2013.01); *B60W 2710/0677* (2013.01); *B60W 2710/081* (2013.01); *B60W 2710/083* (2013.01); *B60W 2710/086* (2013.01); *B60W 2710/105* (2013.01)

(58) Field of Classification Search
CPC . B60W 2510/0638; B60W 2510/0666; B60W 2710/0677; B60W 2710/081; B60W 2710/083; B60W 2710/086; B60W 2710/105
See application file for complete search history.

(56) References Cited

U.S. PATENT DOCUMENTS

| | | | | |
|---|---|---|---|---|
| 8,761,981 | B2 | 6/2014 | Hussain et al. | |
| 9,669,724 | B2 * | 6/2017 | Sisk | B60L 50/61 |
| 10,131,344 | B2 | 11/2018 | Petridis et al. | |
| 12,240,331 | B1 * | 3/2025 | Xu | B60L 15/2045 |
| 2015/0203092 | A1 | 7/2015 | Johri et al. | |
| 2018/0237014 | A1 * | 8/2018 | Nasu | B60W 10/02 |
| 2020/0198495 | A1 | 6/2020 | Rizzoni et al. | |
| 2021/0179062 | A1 | 6/2021 | Lee | |
| 2023/0347872 | A1 * | 11/2023 | Gesang | B60L 7/18 |
| 2024/0351422 | A1 | 10/2024 | Engineer et al. | |

FOREIGN PATENT DOCUMENTS

| | | | |
|---|---|---|---|
| DE | 102012219742 | A1 | 5/2013 |
| JP | S6095238 | A | 5/1985 |

OTHER PUBLICATIONS

Al-Aawar, Nizar et al., “Optimal control strategy for hybrid electric vehicle powertrain.” IEEE Journal of Emerging and Selected topics in Power Electronics, vol. 3, No. 2, 2014, pp. 362-370 (9 pages).

Capito, Vicente, et al. “Implementation of Adaptive Equivalent Consumption Minimization Strategy.” No. 2024-01-2772. SAE Technical Paper, 2024 (12 pages).

Bram de Jager et al., “Optimal control of hybrid vehicles”, Advance in Industrial Control, Springer, 2013 (158 pages).

Onori, Simona et al., Hybrid electric vehicles: Energy management strategies. vol. 13. London, UK: Springer, 2016 (121 pages).

Julakha Jahan Jui et al., “Optimal energy management strategies for hybrid electric vehicles: A recent survey of machine learning approaches”, Journal of Engineering Research, Sep. 2024, vol. 12, issue 3, pp. 454-467 (14 pages).

Yunfei Cao et al., “An Overview of Modelling and Energy Management Strategies for Hybrid Electric Vehicles”, Applied Sciences, 2023, vol. 13, 5947 (23 pages).

Xuequin Lu et al., “Hybrid electric vehicles: A review of energy management strategies based on model predictive control”, Journal of Energy Storage, 2022, vol. 56,106112 (21 pages).

Xiang Changle et al., “Efficiency-based Control Strategy of Dual-mode Hybrid Vehicle”, ITEC Asia-Pacific 2014 1569948637 (5 pages).

Feilong Wang “Research on the Intelligent Energy Governance of Parallel Hybrid Vehicle Based on Deep Learning” Strategic Planning for Energy and the Environment, 2022, vol. 41, No. 2, pp. 195-214 (20 pages).

Matthieu Alistair Orr et al., “Development and Implementation of Control Strategy for a P4 Parallel Through-the-Road Hybrid Electric Vehicle”, McMaster—Mechanical Engineering, 2023 (159 pages).

Dong-Min Kim et al., “Sizing and optimization process of hybrid electric propulsion system for heavy duty vehicle-based on Gaussian process modeling considering traction motor characteristics”, Renewable and Sustainable Energy reviews, 2022, vol. 161, 112286 (34 pages).

International Search Report issued in corresponding International Application No. PCT/US2026/011768; mailed Jun. 5, 2026 (5 pages).

Written Opinion of the International Searching Authority issued in corresponding International Application No. PCT/US2026/011768; dated Jun. 5, 2026 (7 pages).

* cited by examiner

INDEPENDENT WHEEL HYBRID OPTIMIZATION

BACKGROUND

Reducing emissions that result from combustion reactions is one of the foremost points of focus for the development of Internal Combustion Engines (ICE). One potential method of reducing emissions involves the use of hybrid ICE systems, which are conventional ICEs coupled to electrical systems that aid in providing power to the vehicle. Examples of such electrical systems include regenerative braking systems and range extension systems, and often include components such as motors, generators, and batteries. However, due to the fact that existing hybrid systems include electrical systems in addition to a conventional ICE, a hybrid vehicle must be controlled in a manner that balances the advantages and disadvantages of power output by the ICE with those of power provided by the electrical components.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A vehicle includes a crankshaft, motors, generators, a battery, epicyclic geartrains, and an Electronic Control Unit (ECU). The crankshaft rotates from power produced by a combustion reaction. The first motor is positioned on a first side of the vehicle and the second motor is positioned on a second side of the vehicle. Each of the first motor and the second motor rotate when power is supplied thereto. The first generator is positioned on the first side of the vehicle and the second generator is positioned on the second side of the vehicle. Each of the first generator and the second generator generate power when rotated. The battery supplies power to the first motor and the second motor, and receives power from the first generator and the second generator. A first epicyclic geartrain is positioned on the first side of the vehicle and transmits power from at least one of the first motor, the first generator, and the crankshaft to a first wheel assembly positioned on the first side of the vehicle. A second epicyclic geartrain is positioned on the second side of the vehicle and transmits power from at least one of the second motor, the second generator, and the crankshaft to a second wheel assembly positioned on the second side of the vehicle. The Electronic Control Unit (ECU) includes a memory and a processor. The ECU determines an amount of torque to be provided to each of the first side of the vehicle and the second side of the vehicle. The ECU also receives operating constraints associated with the first motor, the second motor, the first generator, the second generator, and the crankshaft. The ECU further determines a global search window for a search for a plurality of global engine operating cases. As part of the search, the ECU calculates a desired torque and a desired rotation speed for each of the first motor and the second motor for each global engine operating case. The ECU also determines determine an amount of power to be produced by each of the first generator and the second generator and returned to the battery for each engine operating case as part of the search. The ECU refines the global search window to a local search window and repeats the search for a plurality of local engine operating cases occupying the local search window. Subsequently, the ECU selects a desired engine operating case and controls the first motor, the second motor, the first generator, the second generator, and parameters of the combustion reaction based upon the selected desired engine operating case.

A method includes receiving, with an ECU, a plurality of operating constraints associated with a first motor, a second motor, a first generator, a second generator, and power provided by a combustion reaction. A first side of a vehicle comprises the first motor, the first generator, a first side of a crankshaft, and a first epicyclic geartrain, and a second side of the vehicle comprises the second motor, the second generator, a second side of the crankshaft, and a second epicyclic geartrain. The method also includes determining an amount of torque to be provided to each of the first side of the vehicle and the second side of the vehicle with the ECU, and determining a global search window for a search for a plurality of global engine operating cases with the ECU. The method further includes determining, with the ECU and as part of the search, an amount of power to be produced by each of the first generator and the second generator and returned to a battery of the vehicle for each engine operating case. The ECU calculates a desired torque and a desired rotation speed for each of the first motor and the second motor for each global engine operating case. Subsequently, the method includes refining the global search window to a local search window with the ECU and repeating the search for local engine operating cases occupying the local search window. The ECU selects a desired engine operating case, and the crankshaft is rotated with power provided by the combustion reaction based on the desired engine operating case such that parameters of the combustion reaction are controlled by the ECU. Power is supplied from the battery to the first motor and the second motor based upon the selected desired engine operating case, and each of the first motor and the second motor rotate when the power is supplied thereto. The battery receives power from the first generator and the second generator based upon the selected desired engine operating case, and each of the first generator and the second generator generate the power when rotated. A first amount of power is transmitted from at least one of the first motor, the first generator, and the first side of the crankshaft to a first wheel assembly positioned on the first side of the vehicle with the first epicyclic geartrain. A second amount of power is transmitted from at least one of the second motor, the second generator, and the second side of the crankshaft to a second wheel assembly positioned on the second side of the vehicle with the second epicyclic geartrain.

Any combinations of the various embodiments and implementations disclosed herein can be used in a further embodiment, consistent with the disclosure. Other aspects and advantages of the claimed subject matter will be apparent from the following description and the claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element in an engine as described herein. In this respect, the term "upper" denotes an element disposed vertically above a corresponding "lower" element relative to an engine as a whole, while the term "lower" conversely describes an element disposed vertically below corresponding "upper" element. Likewise, the term "axial" refers to an orientation substantially parallel to an extension direction of an object, while the term "radial" denotes a direction orthogonal to an axial direction.

In general, embodiments of the invention are directed towards methods and devices for controlling a hybrid electrical vehicle (HEV) that includes a Dedicated Hybrid Engine (DHE). The DHE is designed to incorporate components of both an electrical powertrain and a mechanical powertrain. Thus, the DHE includes integrated electric motors that serve to provide additional power to the vehicle. The DHE further includes motors and generators that recover energy during vehicle deceleration. The proposed devices and methods further relate to determining a power split between the electrical powertrain and the mechanical powertrain based on a user requested torque, and controlling both powertrains according to the determined power split. Because the electrical powertrain and the mechanical powertrain are interconnected by way of a planetary gearset, planetary gearset calculations are used during the process of determining the power split.

Figure 1:
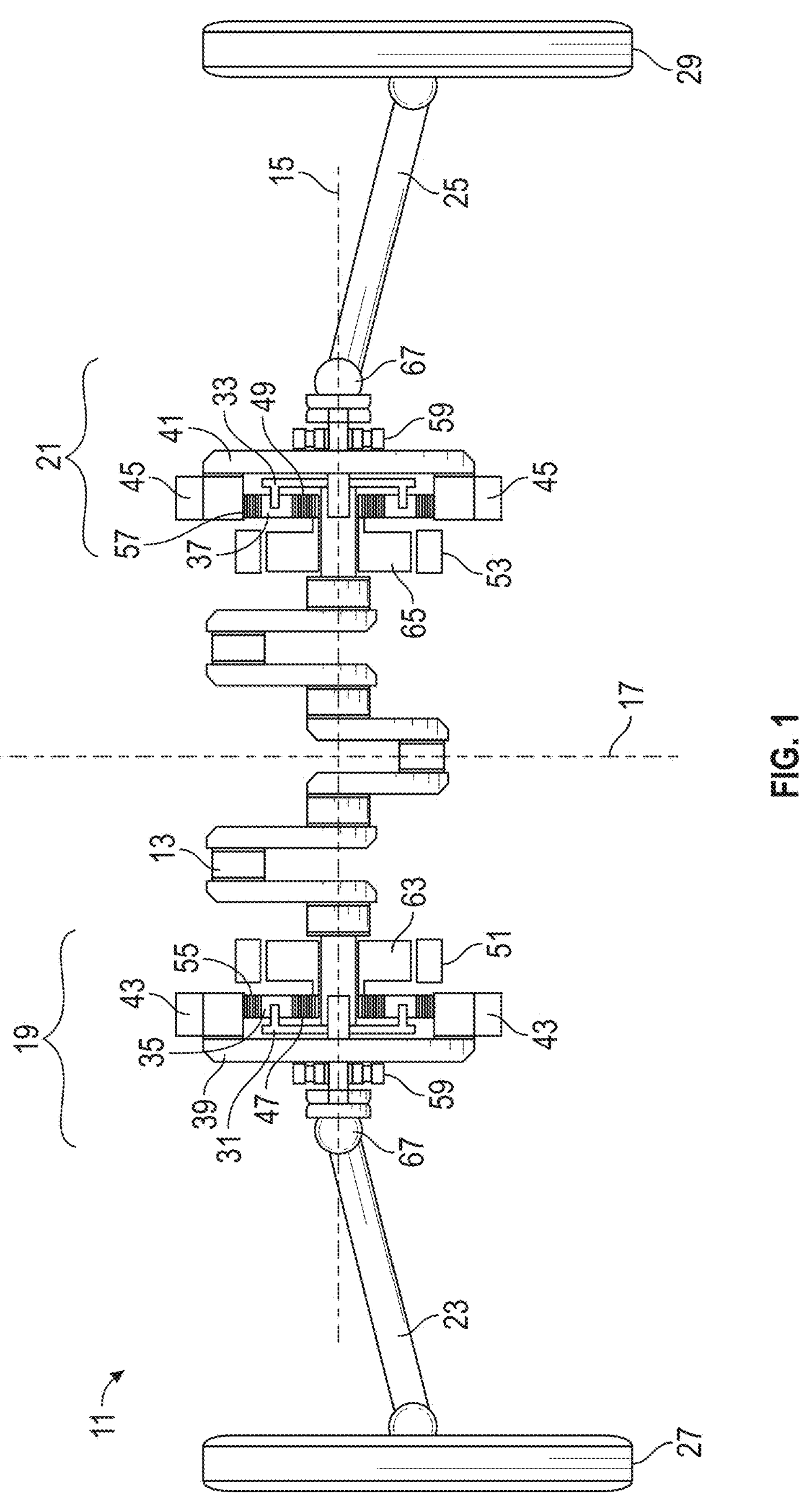
FIG. 1 depicts a top view of a Dedicated Hybrid Engine (DHE), in accordance with one or more embodiments of the present disclosure.

FIG. 1 depicts a DHE 11 in accordance with one or more embodiments disclosed herein. In general, and where appropriate, components of FIG. 1 associated with the DHE 11 may be formed of a metal such as iron, aluminum, steel, an alloy, or any equivalent material without departing from the nature of this specification. Each of the components may be formed of the same material, or may be formed of different materials.

As shown in FIG. 1, a DHE 11 includes a crankshaft 13 that primarily extends along a transverse axis 15 between a first epicyclic geartrain 19 and a second epicyclic geartrain 21. The first epicyclic geartrain 19 connects to a first half shaft 23 connected to a first wheel 27 and the second epicyclic geartrain 21 connects to a second half shaft 25 connected to a second wheel 29. The connection between the first epicyclic geartrain 19 and the first half shaft 23 is a rotating jointed connection, such as a ball joint, a CV joint, or equivalent, which is depicted as the first jointed connection 67 in FIG. 1. The second half shaft 25 is connected to the second epicyclic geartrain 21 with a second jointed connection 67 that has a similar structure to the first jointed connection 67.

Although not depicted in FIG. 1, the crankshaft 13 is actuated by way of a piston that actuates from forces generated by an internal combustion reaction. The motion of the crankshaft 13 is transferred to the first wheel 27 and the second wheel 29 via the first epicyclic geartrain 19 and the second epicyclic geartrain 21, which are embodied as planetary gearsets. Specifically, the crankshaft 13 is rigidly affixed to and rotates the first carrier 31 and the second carrier 33, which respectively rotate a first planet gear 35 and a second planet gear 37. The first planet gear 35 and the second planet gear 37 also mesh with a first ring gear 55 and a second ring gear 57, respectively, which are affixed to a first hub 39 and a second hub 41. Thus, the motion of the crankshaft 13 ultimately rotates a first hub 39, which causes the first half shaft 23 and the first wheel 27 to rotate as well. Similarly, the motion of the crankshaft 13 causes the second hub 41 to rotate, driving the rotation of the second half shaft 25 and the second wheel 29.

Overall, the DHE 11 is symmetrical about a radial axis 17 that extends orthogonal to the transverse axis 15 such that the first epicyclic geartrain 19 and its constituent components (including a first portion of the crankshaft 13) are substantially symmetrical to the orientation of the second epicyclic geartrain 21 and its constituent components (including a second portion of the crankshaft 13), which simplifies the design of the DHE 11. Furthermore, when the DHE 11 is formed with an even number of pistons (not shown), the DHE 11 will also have symmetry about the transverse axis 15.

As discussed above, the first carrier 31 and the second carrier 33 are fixed to a first planet gear 35 and a second planet gear 37. The first planet gear 35 meshes with a first ring gear 55 fixed to a first hub 39 and the second planet gear 37 meshes with a second ring gear 57 that is fixed to a second hub 41. The first hub 39 is surrounded by a first motor coil 43, while the second hub 41 is surrounded by a second motor coil 45. As depicted in FIG. 1, the first epicyclic geartrain 19 and the second epicyclic geartrain 21 are formed with a first motor coil 43 and a second motor coil 45 extending around the periphery thereof such that the first motor coil 43 and the second motor coil 45 form portions of the exteriors of the first epicyclic geartrain 19 and the second epicyclic geartrain 21, respectively. Finally, the first hub 39 and the second hub 41 are supported by a first bearing 59 and a second bearing 61, which serve to stabilize the DHE 11 in relation to the first half shaft 23 and the second half shaft 25.

As is commonly known in the art, a motor is generally formed of a magnetized shaft that is surrounded by a coil of wire. When electricity flows through the coil of wire an electromagnetic field is generated causing the magnetized shaft to rotate (or vice versa). In the case of FIG. 1, the first motor coil 43 and the second motor coil 45 are energized coils of wire, while the first hub 39 and the second hub 41 are magnetized and rotate when the electrical field is generated. Overall, the first hub 39 and the first motor coil 43 form a first motor, while the second hub 41 and second motor coil 45 form a second motor. When electricity flows through the first motor coil 43 and/or the second motor coil 45 the first hub 39 and the second hub 41 rotate, causing the first wheel 27 and the second wheel 29 to rotate as well.

The remainder of the first epicyclic geartrain 19 is formed by a first sun gear 47 that is rigidly fixed to a first sun gear shaft 63 and a first ring gear 55 that is rigidly fixed to the first hub 39. The second epicyclic geartrain 21 is similarly formed of a second sun gear 49 that connects to a second sun gear shaft 65 and a second ring gear 57 that connects to the second hub 41. The first sun gear shaft 63 and the second sun gear shaft 65 are respectively surrounded by a first generator coil 51 and a second generator coil 53 to form a first generator and a second generator. As is also commonly known in the art, a generator includes components substantially similar to a motor, and is formed of a coil of wires that surrounds a magnetized material, or vice versa, where the rotation of the magnetized material generates electricity in the coil of wires. Accordingly, the first generator coil 51 and the second generator coil 53 are coils of wire that serve to transform excess motion from the first sun gear shaft 63 and the second sun gear shaft 65, respectively, into electrical energy that may be stored in a battery of a vehicle (e.g., FIG. 3). Due to the similar design of a generator and a motor, the first generator coil 51 and the second generator coil 53 may be operated as motors by providing electricity thereto. Similarly, the first motor coil 43 and the second motor coil 45 may be operated as generators by rotating the first hub 39 and the second hub 41, which generates electricity that is used to subsequently power the vehicle.

The DHE 11 may be operated in numerous ways depending upon the operation of the first motor coil 43 and the second motor coil 45, the crankshaft 13, and the first generator coil 51 and the second generator coil 53. The DHE 11 receives operating instructions from an Electronic Control Unit (ECU), which is described in conjunction with FIG. 4. As a first mode of operation, the crankshaft 13 is rotated under power provided by the pistons and power is provided to the first motor coil 43 and the second motor coil 45, causing the first hub 39 and the second hub 41 to rotate as well. In this case, the first carrier 31, the second carrier 33, the first hub 39, and the second hub 41 will all rotate in the same direction. The boosted power level is transmitted to the first wheel 27 and the second wheel 29 via the first hub 39 and the second hub 41, where the first wheel 27 and the second wheel 29 rotate at a substantially similar speed as the first hub 39 and the second hub 41.

Due to the aforementioned components rotating in the same direction, the first sun gear 47 and the second sun gear 49 react to the rotation of the first hub 39 and the second hub 41. In particular, because the first motor coil 43 and the second motor coil 45 provide supplemental power in addition to the primary power provided by the crankshaft 13, the first hub 39 and the second hub 41 may rotate faster than the first carrier 31 and the second carrier 33. In such cases, the first planet gear 35 and the second planet gear 37 compensate for this rotational imbalance by rotating the first sun gear 47 and the second sun gear 49, respectively. Because the first sun gear 47 and the second sun gear 49 rotate within the first generator coil 51 and the second generator coil 53, energy from the rotational imbalance is captured and returned to the battery of the vehicle (e.g., FIG. 3).

As a second mode of operation, the DHE 11 may be operated purely based upon the power of the first motor coil 43 and the second motor coil 45. In this case, a combustion reaction does not occur and the crankshaft 13 remains stationary. This, in turn, keeps the first carrier 31 and the second carrier 33 fixed in place. When power is provided to the first motor coil 43 and the second motor coil 45, the first hub 39 and second hub 41 rotate, which rotates the first planet gear 35 and the second planet gear 37 as well as the first half shaft 23 and the second half shaft 25. The rotations of the first half shaft 23 and second half shaft 25 drive the first wheel 27 and the second wheel 29. On the other hand, the rotation of the first planet gear 35 is transmitted directly to the first sun gear 47 and the first sun gear shaft 63, which generates electricity by the first generator coil 51. Similarly, the rotation of the second planet gear 37 is transmitted directly to the second sun gear 49 and the second sun gear shaft 65, which generates electricity by the second generator coil 53. Thus, the second mode of operation is one where the vehicle is only powered with electricity, which is beneficial for reducing emissions as exhaust gases are not generated from the combustion reaction.

In a third mode of operation, power is supplied to the crankshaft 13, the first motor coil 43, the second motor coil 45, the first generator coil 51, and the second generator coil 53. In this case, the power received by the first motor coil 43, the second motor coil 45, the first generator coil 51, and the second generator coil 53 allows the first hub 39, the second hub 41, the first sun gear shaft 63 and the second sun gear shaft 65 to rotate at the same speed as the crankshaft 13. The third mode is useful, for example, as a high torque mode, as each of the components of the DHE 11 are rotated in the same direction and speed, and there is no excess energy captured by the DHE 11.

Each of the operating modes described above reflect situations where an equal amount of power is provided to the first motor coil 43 and the second motor coil 45. However, and as is commonly known in the art, wheels experience different speeds when a vehicle (e.g., FIG. 3) is turning. For example, when a vehicle is making a left-hand turn, the inside (left) wheels will travel a shorter distance than the outside (right) wheels during the same period of time. Thus, when the vehicle is turning, the DHE 11 must account for the difference in power that must be provided to each side of the vehicle. In the context of this disclosure, the phrase "first side" of the DHE 11 refers to the first epicyclic geartrain 19 and connected components, whereas the phrase "second side" of the DHE 11 refers to the second epicyclic geartrain 21 and components connected thereto.

In the case of FIG. 1, the first motor coil 43, the second motor coil 45, the first generator coil 51, and the second generator coil 53 provide differential power to the first and second sides of the DHE 11. Specifically, while the vehicle is turning, the first motor coil 43 will receive more power than the second motor coil 45, or vice versa. The excess power causes the first half shaft 23 to rotate faster than the second half shaft 25 (or vice versa), which causes the vehicle (e.g., FIG. 3) as a whole to turn. Alternatively, the vehicle (e.g., FIG. 3) may turn by capturing excess power with the first generator coil 51 or the second generator coil 53, rather than generating power in the first motor coil 43 or second motor coil 45. Furthermore, either of the first motor coil 43 or the second motor coil 45 may be energized while the opposing second generator coil 53 or first generator coil 51 respectively generates power.

The method of turning the first wheel 27 and the second wheel 29 depends upon the speed of the vehicle while turning, the radius of the turn, and the overall power level of the vehicle as discussed further below in relation to FIGS. 4 and 5. For example, if the battery is fully charged and the vehicle is turning at a relatively low speed, the first half shaft 23 and the second half shaft 25 may receive turning power from the first motor coil 43 and the second motor coil 45 to ensure that the turn is completed. On the other hand, if the battery of the vehicle has a low charge level, and the vehicle is traveling at a high rate of speed, the first generator coil 51 and the second generator coil 53 may be used in conjunction with combustion power provided by the crankshaft 13 to turn the vehicle in order to generate electricity that charges the battery. As noted above, the DHE 11 is controlled with an ECU (e.g., FIG. 4), which determines the mode of operating the DHE 11 as well as controlling the amount of power transmitted to the first motor coil 43 and the second motor coil 45.

Figure 2:
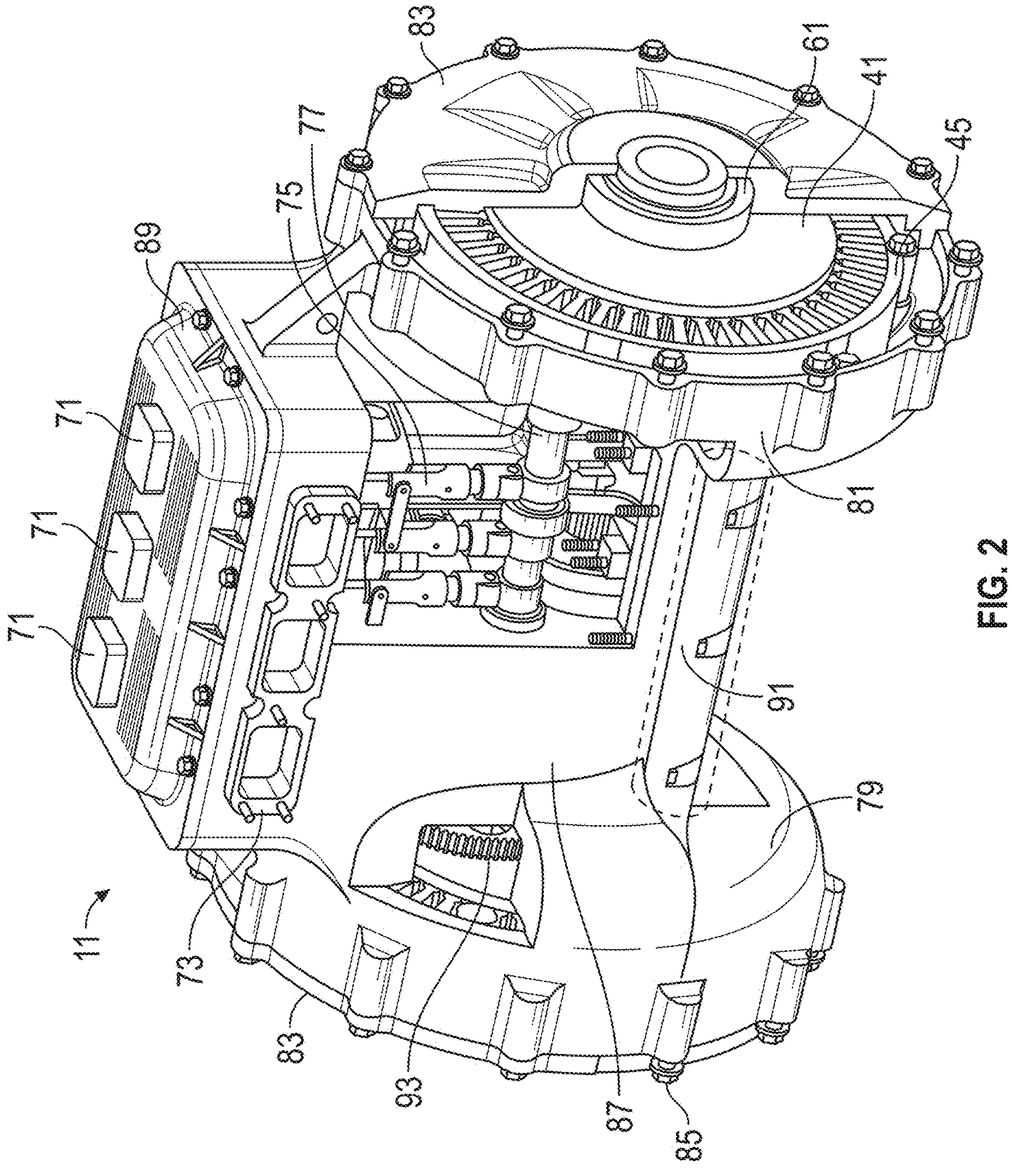
FIG. 2 depicts an isometric view of a DHE in accordance with one or more embodiments of the present disclosure.

FIG. 2 depicts an isometric view of a DHE 11 consistent with one or more embodiments of the invention described herein. As shown in FIG. 2, components of the DHE 11 are encased in an engine block 87, which may be formed of steel, iron, aluminum, an alloy, or equivalent material known to a person of ordinary skill in the art. The engine block 87 is formed from a single block of material through a casting or machining process, which advantageously simplifies the overall design of the DHE 11.

Components of the DHE 11 that facilitate the combustion reaction are inserted through the uppermost portion of the engine block 87 and a lowermost portion of the engine block 87. The upper portion of the engine block 87 is enclosed by a valve cover 89, and the bottom portion of the engine block 87 is covered by a crankshaft carrier 91. Although not depicted in FIG. 2 for the sake of simplicity, the combustion chambers are positioned immediately below the valve cover 89. Similarly, the pistons (not shown) are disposed in the combustion chambers and positioned immediately below the valve cover 89.

The valve cover 89 includes multiple spark plug assemblies 71, where each spark plug assembly 71 is associated with a separate combustion chamber (not shown) of the DHE 11. The spark plug assemblies 71 serve to generate electrical arcs, or sparks, that initiate combustion reactions in the combustion chambers. Air for the combustion reaction is received in the combustion chambers by way of a series of intake ports 73, which are orifices that extend from an external environment to the combustion chamber. Fuel for the combustion reaction may be received in the combustion chambers through the spark plug assemblies 71 in a direct injection arrangement, or alternatively through the intake ports 73 in a port fuel injection arrangement. Thus, the spark plug assembly 71 includes components such as a spark plug, a fuel injector (if applicable), connecting wires, and associated components that initiate a combustion reaction in the combustion chambers.

The flow of fluid through the intake ports 73 is controlled by a plurality of pushrods 75, which extend vertically through the DHE 11. In particular, the pushrods 75 actuate intake valves (not shown) internal to the DHE 11 that selectively cover the intake ports 73 to allow fluid communication with the combustion chambers (e.g., FIG. 4). The pushrods 75 are actuated by a camshaft 77 that extends in the transverse direction through the DHE 11, and the camshaft 77 is geared to the crankshaft 13 with a camshaft timing gear 93 such that the camshaft 77 rotates therewith. On the other hand, burnt combustion gases generated from the combustion reaction are expelled from the DHE 11 via a series of exhaust ports that are located opposite the intake ports 73. The exhaust ports (not shown) also have a fluid flow controlled by exhaust valves actuated by pushrods 75. The inclusion of pushrods 75 aids in simplifying the design of the DHE 11, as the pushrods 75 have a compact design that does not require the camshaft 77 to be positioned above the combustion chamber and thus does not interfere with the components of the valve cover 89.

Continuing with FIG. 2, each transverse end of the engine block 87 houses components of the first epicyclic geartrain 19 and the second epicyclic geartrain 21. Thus, as shown in FIG. 2, the engine block 87 includes a first geartrain compartment 79 that houses the first epicyclic geartrain 19. On the other hand, a second geartrain compartment 81 houses the second epicyclic geartrain 21 which is depicted as including the second motor coil 45 and the second hub 41. As shown in FIG. 2, the first geartrain compartment 79 and the second geartrain compartment 81 are formed as substantially cylindrical portions of the engine block 87. Each geartrain compartment is covered by a cover 83 such that only the first hub 39 and the second hub 41 extend out of the cover 83 in order to rotate the first half shaft 23 and the second half shaft 25. The cover 83 is formed as a circular sheet of metal or an equivalent rigid material, and is fixed to the engine block 87 with bolts 85.

Overall and as described above, the engine block 87 forms the primary structure for assembling the DHE 11. Because the engine block 87 is formed of a unitary block of material and does not require disassembly, components of the DHE 11 may be quickly accessed by unbolting the component (or its assembly) from the engine block 87. Such is in stark contrast to a modern combustion engine, which is typically formed of multiple engine blocks such as an upper engine block and a lower engine block that are fixed to each other. That is, a DHE 11 having an engine block 87 is advantageous, for example, because it is not necessary to disassemble the engine block 87 to access the pistons, the combustion chambers, or the crankshaft 13. Rather, the pistons and the combustion chambers may be simply accessed by removing the valve cover 89, and the crankshaft 13 may be accessed by removing the crankshaft carrier 91.

Figure 3:
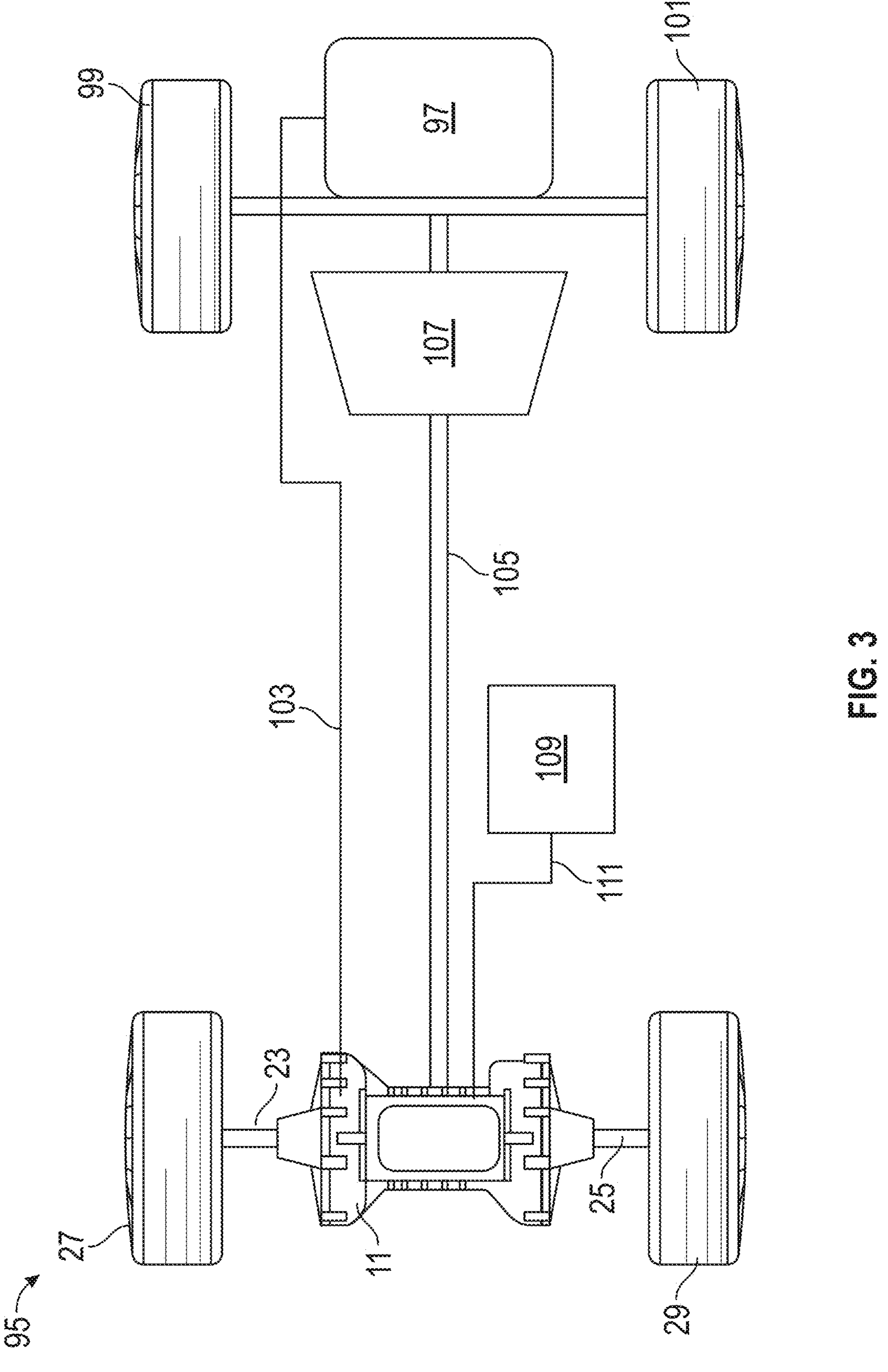
FIG. 3 depicts a vehicle in accordance with one or more embodiments of the present disclosure.

Turning to FIG. 3, FIG. 3 depicts an embodiment of a vehicle 95 including a DHE 11 according to one or more embodiments disclosed herein. As shown in FIG. 3, the DHE 11 is centered between the first wheel 27 and the second wheel 29 such that the DHE 11 is disposed at the front of the vehicle 95. To rotate the first wheel 27 and the second wheel 29, the DHE 11 receives power, via a power line 103, from a battery 97 disposed between a third wheel 99 and a fourth wheel 101 located at the rear of the vehicle. The power line 103 is formed of copper, aluminum, or equivalent wire, while the battery 97 may be formed with a lithium-ion composition, a lead acid composition, or equivalent energy storage compositions. As discussed above, power stored in the battery 97 is used to send and receive power from the first motor coil 43, the second motor coil 45, the first generator coil 51, and the second generator coil 53. As the first motor coil 43 and the second motor coil 45 rotate, the first half shaft 23 and the second half shaft 25 rotate causing the first wheel 27 and the second wheel 29 to rotate as well.

The DHE 11 receives fuel via a fuel supply line 105 from a fuel tank 107. The fuel tank 107 stores combustible fuel such as gasoline, hydrogen gas, propane, or equivalent liquids. The fuel is used by the DHE 11 to create a combustion reaction within the combustion chambers, and is ignited therein with the aid of the spark plug assembly 71. As discussed above, the combustion reaction in the combustion chambers causes pistons to rotate a crankshaft 13, which, in turn, rotates the first half shaft 23 and second half shaft 25 to rotate the first wheel 27 and the second wheel 29. Thus, the DHE 11 is capable of being driven under the power of a combustion reaction, power stored in the battery 97, or a combination thereof based upon a selected operating mode.

To receive operating instructions, the DHE 11 is connected to an Electronic Control Unit (ECU) 109 via a bus 111. As described herein, the ECU 109 is one or more processors, microprocessors, logic units, controllers, and/or integrated circuits that receive, process, and transmit operating commands to actuate the vehicle 95. As described below in relation to FIG. 4, the ECU 109 may be coupled to or include any number of auxiliary devices such as data storage means that retains the operating mode of the DHE 11, transceivers to facilitate receiving and transmitting the operating mode, and/or sensors that receive data on the operating conditions of the DHE 11, for example, without departing from the nature of this disclosure.

On the other hand, the bus 111 is a series of wires, optical fibers, printed circuits, or equivalent structures for transmitting signals between computing devices. Furthermore, although described above as a physical connection, the bus 111 may alternatively be embodied as a virtual network connection between computing devices, such as Wi-Fi, Bluetooth, Zigbee (trademarked), Long-Term Evolution (LTE), $5^{th}$ Generation (5G), or other equivalent forms of networking communication. Thus, the bus 111 forms one or more transmitter(s) and receiver(s) between the various components described herein.

Figure 4:
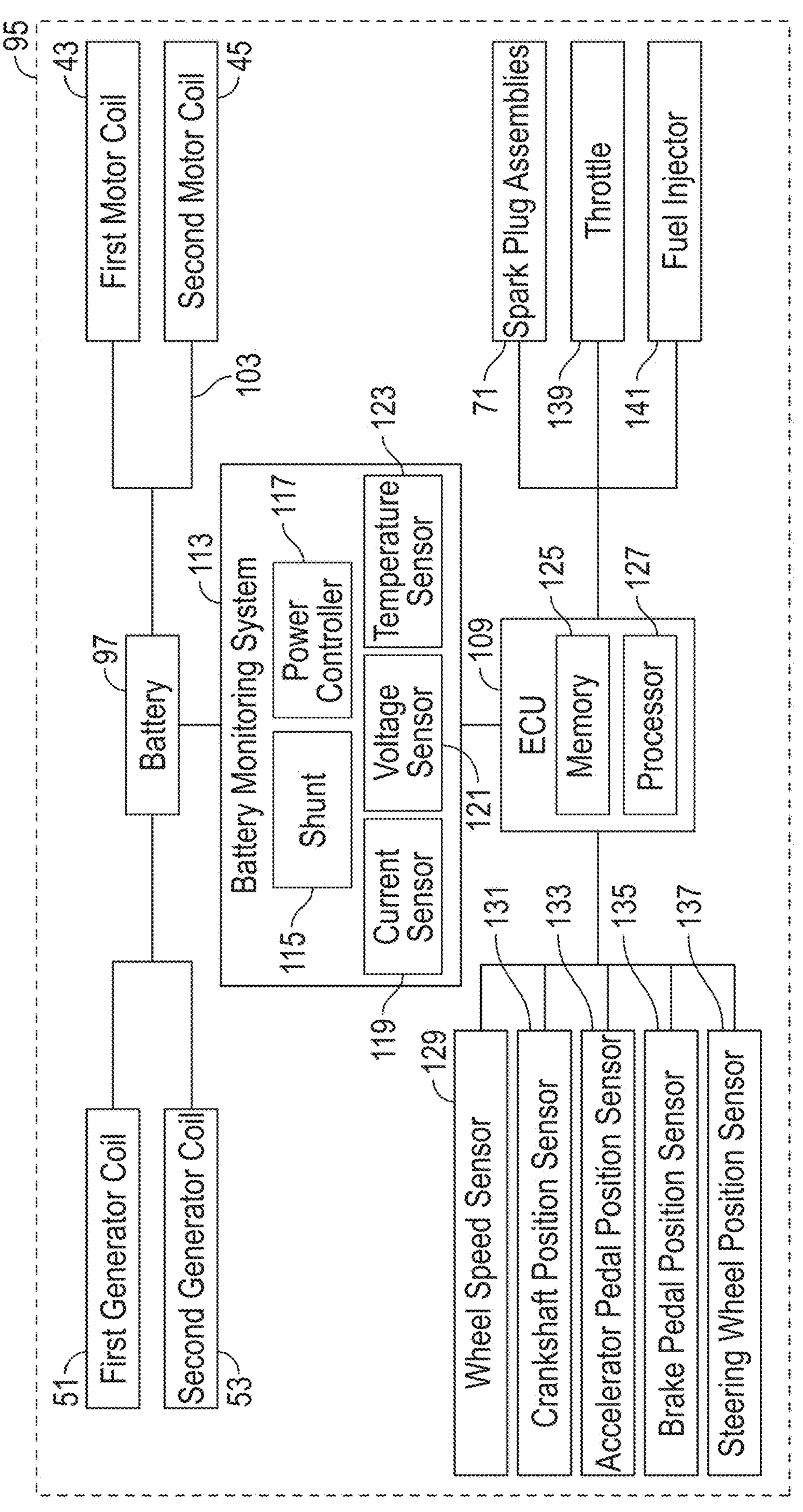
FIG. 4 depicts a vehicle hardware block diagram in accordance with one or more embodiments of the present disclosure.

Turning to FIG. 4, FIG. 4 depicts a block diagram overview of a vehicle 95 in accordance with one or more embodiments of the present disclosure. The vehicle 95 is depicted as including components described above in relation to FIGS. 1-3 such as the first motor coil 43, the second motor coil 45, the first generator coil 51, the second generator coil 53, the spark plug assembly 71, and the battery 97. Briefly, and as discussed above, the first motor coil 43 and the second motor coil 45 serve to rotate from power provided by the battery 97. The first generator coil 51 and the second generator coil 53 function in an opposite fashion, and the rotation of these components generates electricity that is returned to the battery 97. The spark plug assembly 71 is directed by the ECU 109 to generate an electrical arc that initiates the combustion reaction in the DHE 11. As noted above, the DHE 11 will include multiple spark plug assemblies 71, and only one spark plug assembly 71 is depicted in FIG. 4 for the sake of simplicity. The battery 97 is connected to the first motor coil 43, the second motor coil 45, the first generator coil 51, and the second generator coil 53 by way of one or more power lines 103. The power lines 103 are metal wires designed with an appropriate diameter and composition to transmit the high voltage electricity required by the vehicle 95.

The vehicle 95 further includes a Battery Monitoring System (BMS) 113 that functions to control power transport to and from the battery 97. The BMS 113 includes a shunt 115, a power controller 117, a current sensor 119, a voltage sensor 121, and a temperature sensor 123. The current sensor 119 determines the amount of current being transferred into and out of the battery 97 based on the vehicle 95 usage. The current sensor 119 may operate according to numerous principles such as induction based current detection (i.e., a Current Transformer or a Rogowski Coil) or magnetic field sensing (i.e., a Hall effect sensor). The voltage sensor 121 operates according to similar principles, and may be embodied as an Alternating Current (AC) sensor, a Direct Current (DC) sensor, or a contact voltage sensor. The temperature sensor 123 measures the temperature of the battery 97, and may be embodied as a thermistor, a thermocouple, or an equivalent temperature sensing device known to a person of ordinary skill in the art. The power controller 117 includes one or more relays, and operates to adjust the amount of power passed from the battery 97 to the first motor coil 43 and the second motor coil 45, and to control the amount of power the battery 97 receives from the first generator coil 51 and the second generator coil 53.

The shunt 115 is formed as a circuit breaker that disconnects the battery 97 from the generator coils 51, 53 and the motor coils 43, 45. The shunt 115 may be tripped by instructions from the ECU 109 when the current sensor 119, the voltage sensor 121, or the temperature sensor 123 detects damaging or disadvantageous operating conditions. For example, if the voltage sensor 121 outputs a value of zero, indicating a short circuit in electrical components of the vehicle 95, the ECU 109 directs the shunt 115 to actuate. As a second example, if the temperature sensor 123 indicates a battery 97 temperature that meets or exceeds a manufacturer's suggested operating temperature, the ECU 109 directs the shunt 115 to actuate in order to prevent thermal damage to the battery 97.

Although not depicted in FIG. 4, additional shunts 115 may be located between each generator coil 51, 53 and the battery 97, as well as between each motor coil 43, 45 and the battery 97. The additional shunts 115 allow the BMS 113 to selectively deactivate the electric motor and/or generator functions of the DHE 11, while still retaining partial functionality by virtue of the remaining active components. Furthermore, the use of additional shunts 115 allows the BMS 113 to deactivate components on a particular side of the vehicle 95, while components on the other side of the vehicle 95 remain active. For example, the ECU 109 direct a shunt 115 located between the generator coils 51, 53 and the battery 97 to trip in order to electrically isolate the battery 97 from the generator coils 51, 53 so that the DHE 11 is not damaged or negatively impacted by a short circuit in the generator coils 51, 53. In the event that the shunt 115 trips, the vehicle 95 may still be operated in a combustion only mode without supplementary power provided by the electrical components.

Continuing with FIG. 4, the ECU 109 is formed of a memory 125 and a processor 127. The memory 125 includes a non-transitory storage medium such as flash memory, a Hard Disk Drive (HDD), a solid state drive (SSD), a combination thereof, or equivalent storage devices. In relation to the invention as described herein, the memory 125 stores computer readable instructions, executed by a processor 127, that relate to controlling the combustion reactions generated by the DHE 11. The computer readable instructions further include commands to control the amount of power provided to the motor coils 43, 45, and to control the amount of power received from the generator coils 51, 53, as discussed further below. The processor 127 is formed by one or more processors, integrated circuits, microprocessors, or equivalent computing structures that serve to execute computer readable instructions stored on the memory 125.

The remainder of FIG. 4 includes sensors and actuators that feed information to the ECU 109 or are actuated thereby. Specifically, components connected to the left hand side of the ECU 109 in FIG. 4 are components that provide information to the ECU 109, whereas components connected to the right hand side of the ECU 109 are components controlled by the ECU 109. Components feeding information to the ECU 109 include a wheel speed sensor 129, a crankshaft position sensor 131, an accelerator pedal position sensor 133, a brake pedal position sensor 135, and a steering wheel position sensor 137. These components are further discussed below, and generally capture time-series data reflecting a particular operating parameter of the vehicle 95. On the other hand, components that are controlled by the ECU 109 include the spark plug assemblies 71, a throttle 139, and a fuel injector 141, which are also discussed further below.

The wheel speed sensor 129 and the crankshaft position sensor 131 are each formed as encoders. As described herein, an encoder may operate using a hall effect sensor (not shown) and a magnet (not shown), where the magnet is attached to the moving body and the hall effect sensor captures variations in the strength of the magnetic field produced by the magnet. Alternatively, the encoder may operate using a Light Emitting Diode (LED) (not shown), a slotted disk (not shown) coupled to the moving body, and a photovoltaic cell (not shown). In this case, the LED transmits a focused light beam to the photovoltaic cell through the slots of the moving disk, and the photovoltaic cell outputs a signal corresponding to the time at which the light beam excites the cell. Accordingly, the phrase "encoder" is not limited to a particular type of encoder, and other types of encoders may be substituted for the encoders discussed above. Additionally, the wheel speed sensor 129 and the crankshaft position sensor 131 may be different types of encoders or the same type of encoder without departing from the nature of this disclosure. The wheel speed sensor 129 may be disposed, for example, to capture the amount of rotation of the first half shaft 23 or the second half shaft 25, and multiple wheel sensors 129 are included for a single vehicle 95 to separately capture the motion of each wheel 27, 29, 99, and 101. The crankshaft position sensor 131 is positioned to capture the rotation speed of the crankshaft 13, and may be located within the engine block 87, the first geartrain compartment 79, or the second geartrain compartment 81 of the DHE 11.

The accelerator pedal position sensor 133 and the brake pedal position sensor 135 are disposed in the cabin (not shown) of the vehicle 95 and are affixed to an acceleration pedal (not shown) and a brake pedal (not shown), respectively. The accelerator pedal position sensor 133 and the brake pedal position sensor 135 each include one or more associated potentiometers that capture and transmit a resistance measurement corresponding to the actuation degree of the respective pedal. The resistance captured by the accelerator pedal position sensor 133 corresponds to a driver request for additional torque (i.e., an increased vehicle speed), whereas the resistance captured by the brake pedal position sensor 135 corresponds to a driver request for less torque (i.e., a decreased vehicle speed). The requests provided by the pedal position sensors 133, 135 are passed to the ECU 109, which controls the DHE 11 based on the driver request as discussed further below.

The steering wheel position sensor 137 is embodied as an encoder or a potentiometer. The steering wheel position sensor 137 is affixed to a steering wheel (not shown) that is actuated by the driver of the vehicle 95 to control the motion path thereof. Thus, the steering wheel position sensor 137 outputs a resistance measurement that corresponds to the degree of actuation of the steering wheel (not shown). The ECU 109 receives the resistance measurement, and performs conversions based on the structure of the steering wheel position sensor 137 to determine the rotation angle of the steering wheel. Similar conversions are performed to the resistance measurements provided by the wheel speed sensor 129, the crankshaft position sensor 131, the accelerator pedal position sensor 133, and the brake pedal position sensor 135. Overall, the ECU 109 is configured to determine, based on the aforementioned resistance measurements, the current speed of each wheel 27, 29, 99, and 101, the desired speed and steering angle of the vehicle 95, and the current speed of the crankshaft 13.

As mentioned above, components controlled by the ECU 109 include, in part, the spark plug assemblies 71, the throttle 139, and the fuel injector 141. The spark plug assemblies 71 operate to generate an ignition arc, or spark, within the combustion engine portion of the DHE 11. The spark generated by a spark plug assembly 71 ignites the fuel mixture disposed in a corresponding cylinder, initiating the power phase of a four stroke engine process. Control of the spark plug assembly 71 as described herein includes controlling the time at which the spark is generated, such that the ECU 109 facilitates combustion timing in the DHE 11. Adjusting the combustion timing, or "combustion phasing" as is commonly known in the art, involves advancing or retarding the ignition timing to be earlier or later than a manufacturer's specified actuation time, respectively. Ignition timing is determined in terms of a crankshaft 13 angle captured by the crankshaft position sensor 131. Thus, changing or controlling the ignition timing implies directing the spark plug assembly 71 to fire at a different crankshaft 13 angle that is either greater than or less than the current ignition timing crankshaft 13 angle, depending on whether the ignition timing is being advanced or retarded. It is noted that although the spark plug assemblies 71 are depicted as a single block in FIG. 4 for visual clarity, the ECU 109 will control each spark plug assembly 71 separately.

The throttle 139 serves to control the volume of air that is fed to the DHE 11 via the intake ports 73. Typically, the throttle 139 is positioned upstream of an intake manifold (not shown) that connects from a cold air intake (not shown) to each intake port 73. The throttle 139 is thus positioned to selectively prohibit or allow the flow of air to the intake ports 73. The throttle 139 includes a butterfly valve (not shown) that is actuated according to instructions provided by the ECU 109. By controlling the aperture of the throttle 139, the ECU 109 effectively controls the ratio of air to fuel in the resulting fuel mixture formed in the combustion chambers (not shown) of the DHE 11.

The fuel injector 141 is embodied as a pintle valve or a solenoid valve that allows pressurized fuel to be fed from the battery 97 into the DHE 11. In one embodiment, the fuel injector 141 may be embodied as a port fuel injector that sprays fuel into the intake manifold adjacent to the intake ports 73. Alternatively, the fuel injector 141 may be formed as a plurality of direct injectors that inject fuel directly into each combustion chamber (not shown). In general, port fuel injection requires less injectors than direct injection, and is thus cheaper and generally easier to implement. However, port fuel injection comes at the cost of sacrificing fuel efficiency, and direct injectors may be preferred when stringent fuel use is preferred over simplicity of design. As a result, the particular structure of the fuel injector 141, as well as the number of fuel injectors 141, will vary according to a desired use case of the DHE 11 as a whole.

Figure 5:
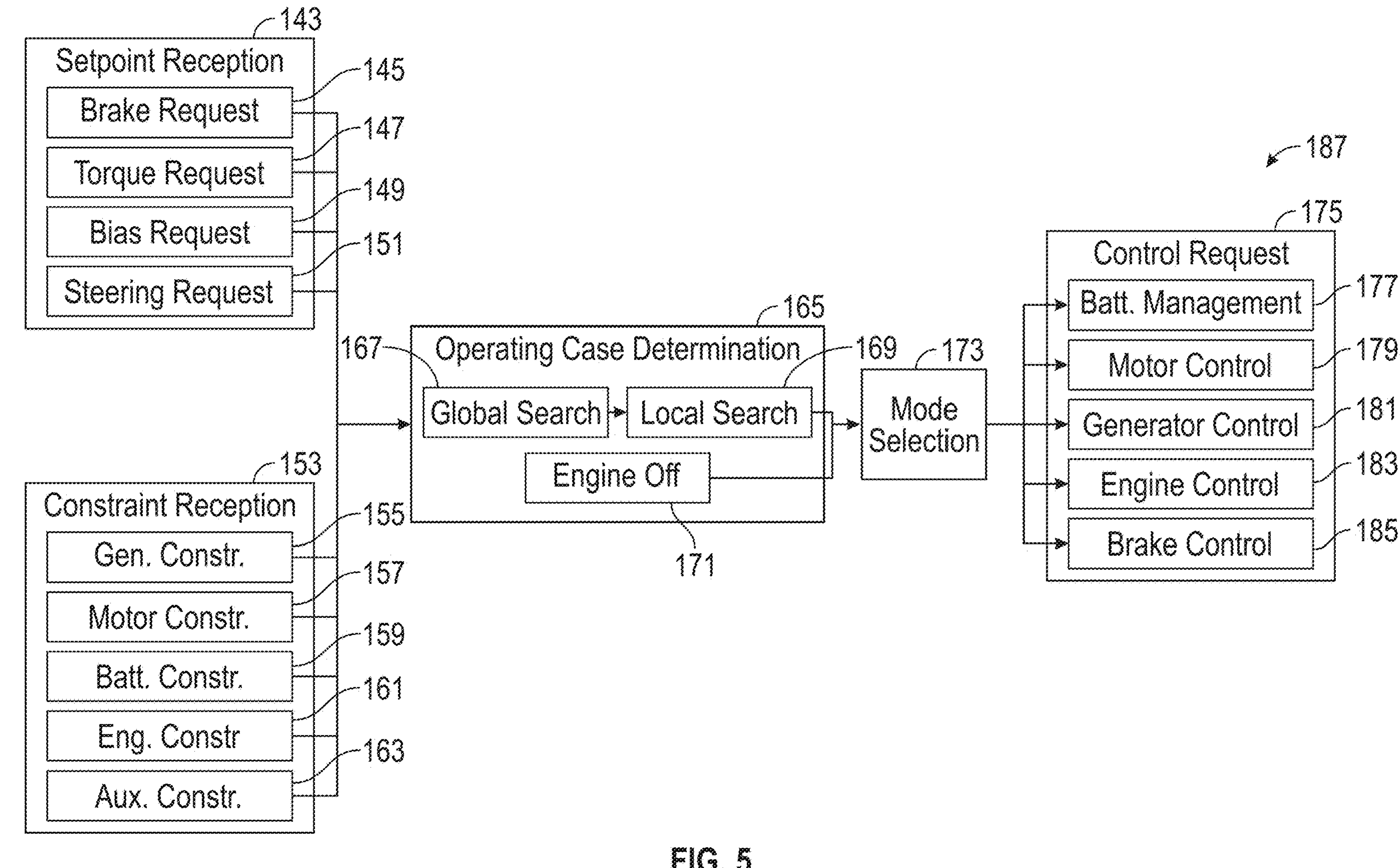
FIG. 5 depicts a flowchart of a process in accordance with one or more embodiments of the present disclosure.

Turning to FIG. 5, FIG. 5 depicts a block diagram illustrating a control algorithm 187 that is executed by the ECU 109 to command the components of the DHE 11 depicted in FIGS. 1-4. Computer code forming the algorithm is stored on the memory 125 of the ECU 109, and is executed by the processor 127 of the ECU 109. The control algorithm 187 is formed of five primary portions: a setpoint reception block 143, a constraint reception block 153, an operating case determination block 165, a mode selection block 173, and a control request block 175. Each of the aforementioned blocks is discussed further below.

Throughout this disclosure, the terms "power loss," "generated electrical power," "regenerative braking electrical power," and "tractive power." Each of these terms are defined as follows, and may be expressed in units of power:

a) Power loss: Corresponds to the electrical power efficiency deficit compared to an ideal component efficiency.

b) Generated electrical power: Electrical power that is provided by the generator coils during the internal combustion engine operation.

c) Regenerative braking electrical power: Electrical power provided by the motor coils during braking.

d) Tractive power: Mechanical power that is provided by the system directly to the output shafts and wheels to propel a vehicle.

The setpoint reception block 143 functions to receive driver requests for controlling the DHE 11. Specifically, the setpoint reception block 143 includes a brake request block 145, a torque request block 147, a bias request block 149, and a steering request 151. The brake request block 145 functions to receive, convert, and interpret the electrical resistance provided by the brake pedal position sensor 135 into a driver issued braking command. Similarly, the torque request block 147 serves to receive, convert, and interpret the electrical resistances provided by the accelerator pedal position sensor 133 into a driver issued acceleration command. In the event that the ECU 109 is in complete control of the vehicle acceleration and braking, such as during highway cruising or autonomous driving, the brake request block 145 and the torque request block 147 collectively serve to determine a torque increase (acceleration) or decrease (braking) value to maintain operation of the vehicle 95. Furthermore, each block stores related requests in a time-series data format, such that general trends can be observed by the ECU 109 when the ECU 109 compares two or more data points or time-series data sets.

The bias request block 149 generates a detailed list of current parasitic and auxiliary power losses experienced by the vehicle 95. Sources of the parasitic and auxiliary power losses include, but are not limited to, the use of Air Conditioning (AC) systems in the vehicle 95, aftertreatment heating systems employed by the vehicle 95, and media entertainment systems such as stereos and center console displays, which are not depicted in the figures for the sake of brevity. The detailed list of power losses includes a brief description or code related to the power loss apparatus (e.g., a denotation of "AC" for the power loss due to the use of an AC system). The detailed list also includes the amount of power lost to the source, which is determined by monitoring the duration of power supply as well as the voltage and/or current supplied to the source. In this way, the bias request block 149 accounts for power requests of various subsystems of the vehicle 95 and ensures that a requisite amount of power is reserved to operate said subsystems as described further below.

The steering request block 151 receives input from the steering wheel position sensor 137. In general, the steering request 151 functions to receive the resistance measurement provided by the steering wheel position sensor 137 and convert the resistance measurement into a desired rotation angle of the front wheels 27, 29 of the vehicle 95. The resistance measurement is captured as time series data as discussed above. Based on the physical structure of the vehicle 95 (i.e., the length of the half shafts 23, 25, the width of the tires 27, 29, 99, and 101, etc.), the time-series steering request data can be compared to the vehicle speed captured by the wheel speed sensor 129 in order to determine the desired angular position, velocity, and acceleration of the vehicle 95.

The resistance measurement received from the steering wheel position sensor 137 is converted based on the structure of the vehicle by the steering request block 151 to a percentage corresponding to the actuation direction and degree of actuation of the steering wheel (not shown). In this regard, the resistance measurement is converted to a steering force value of less than 50% for a left hand turn of the vehicle 95, whereas a steering force value greater than 50% indicates a right hand turn of the vehicle 95. A steering force value of 50% indicates that the steering wheel (not shown) is in a neutral position and the vehicle 95 should maintain a linear course. A steering force value of 0% thus indicates a maximum actuation of the steering wheel for a left hand turn, and a value of 100% indicates a maximum actuation of the steering wheel for a right hand turn. Overall, based on the steering wheel force provided by the steering request 151 and the other requests of the setpoint reception block 143, the ECU 109 is apprised of the driver's requested steering direction for the vehicle 95 in terms of wheel torque, power, and speed for each of the first side of the vehicle 95 (i.e., including the first epicyclic geartrain 19) and the second side of the vehicle 95 (i.e., including the second epicyclic geartrain 21).

The second portion of the control algorithm 187 is formed by the constraint reception block 153. The constraint reception block 153 functions to receive maximum and minimum operating conditions for the vehicle 95 and components thereof, where the operating conditions are stored on the memory 125 of the ECU 109. The constraints are received from and stored in component controllers (not shown) associated with each component. For example, constraints related to the first motor coil 43 and the second motor coil 45 are stored in the associated motor coil controllers (not shown), and transmitted to the constraint reception block 153 thereby. Specifically, the constraint reception block 153 includes a generator constraint block 155, a battery constraint block 159, a motor constraint block 157, an engine constraint block 161, and an auxiliary constraint block 163. Each block of the constraint reception block 153 is discussed further below. The constraints reflected in each block discussed below are determined based upon component operating limits provided by a manufacturer or operator of the vehicle 95 or the DHE 11.

The generator constraint block 155 receives values associated with the maximum operating conditions of the first generator coil 51 and the second generator coil 53. The aforementioned maximum operating conditions include the maximum rotation speed of the generator coils 51, 53, as well as the maximum power output, voltage limits, and current limits of each generator coil. In addition, because the DHE 11 is capable of using the generator coils 51, 53 to rotate the first hub 39 and the second hub 41, the generator constraint block 155 includes the maximum amount of power that may be provided to the generator coils 51, 53. That is, the generator constraint block 155 receives the maximum power input and power output of each of the first generator coil 51 and the second generator coil 53. The motor constraint block 157 functions in a similar fashion to receive the current, voltage, and power input and output limits of the first motor coil 43 and the second motor coil 45.

The battery constraint block 159 receives power transfer related constraints for the battery 97, similar to the generator constraint block 155 and the motor constraint block 157. Such power related constraints include maximum and minimum voltage, current, and power input and output limits of the battery 97. Further constraints include a current battery capacity, the current battery health (i.e., a percentage of battery degradation), and similar design and operating parameters as will be appreciated by a person of ordinary skill in the art. The limits may be determined based upon the chemical and physical composition of the battery 97, the structure and composition of the power line 103, and the desired use case of the vehicle 95. For example, a heavy duty vehicle such as a semi-truck will be equipped with a larger battery capacity than a light duty fleet vehicle such that the particular battery 97 design and related constraints are tied, in part, to the contemplated use case of the vehicle 95.

The engine constraint block 161 receives operating limits related to the combustion engine portion of the DHE 11. The operating limits include, but are not limited to, the maximum and minimum rotation speeds of the crankshaft 13, the desired compression ratio of the combustion reaction, the stroke length of the pistons (not shown), the air to fuel ratio employed by the DHE 11, and similar operating parameters. The aforementioned operating limits are not all inclusive, and it will be appreciated that other operating limits, such as those related to exhaust emissions, have been omitted for the sake of brevity. It will further be appreciated that the above described operating limits may be adjusted from the operator or manufacturer's provided constraints to account for operating conditions such as low air density and cold air friction, ambient temperature, among other conditions.

The auxiliary constraint block 163 receives any constraints not reflected by the above constraint blocks but are relevant to operating the DHE 11. For example, if the vehicle 95 includes additional subsystems (not shown) such as, but not limited to, Exhaust Gas Recirculation (EGR) subsystems, turbocharging or supercharging subsystems, or exhaust gas treatment subsystems (e.g., a Three-Way Catalytic converter (TWC)), the auxiliary constraint block 163 receives operating limits associated therewith. Continuing with the above provided examples, EGR subsystem (not shown) constraints may include an amount of power required to operate an EGR pump and valve (not shown). Similarly, turbocharging subsystem (not shown) constraints may include a maximum intake air compression rate or turbine speed, whereas exhaust gas subsystem (not shown) constraints may include a power loss to the exhaust treatment device (not shown).

The operating case determination block 165 functions to determine, based on values received in the setpoint reception block 143 and the constraint reception block 153, a desired engine operating case. In the context of this disclosure, the phrase "operating case" refers to a list of desired operating parameters for actuating components of the DHE 11 in order to control the motion of the vehicle 95 as a whole. The engine operating cases broadly fall into two categories: engine on operating cases and engine off operating cases. Briefly, the engine on operating cases are defined in terms of torque with units of Newton-meters (Nm) and engine speed with units of Rotations Per Minute (RPMs). Each engine on operating case may include tractive power generated by the combustion engine portion of the DHE 11, regenerative braking electrical power associated with the motor coils 43, 45, and/or generated electrical power associated with the generator coils 51, 53 such that each engine operating case correlates to speed and torque combinations for the combustion engine portion of the DHE 11, the motor coils 43, 45, and the generator coils 51, 53. Overall, the engine on operating cases encompass situations where power loss, generated electrical power, regenerative braking electrical power, and tractive power are provided by any or all of: the combustion engine portion of the DHE 11, the generator coils 51, 53, and the motor coils 43, 45. On the other hand, engine off operating cases encompass situations where the vehicle 95 is driven without tractive power from the combustion engine portion of the DHE 11. That is, engine off operating cases encompass power provided to the motor coils 43, 45, power provided to the generator coils 51, 53, generated electrical power received from the generator coils 51, 53, and regenerative braking electrical power provided by the motor coils 43, 45.

Continuing with FIG. 5, the operating case determination block 165 is formed of two portions: a global search block 167 and a local search block 169. The global search block 167 and the local search block 169 function to collectively determine an optimal operating case involving components of the DHE 11. The global search block 167 and the local search block 169 both contemplate cases where the combustion engine portion of the DHE 11 is on, and both search blocks contemplate cases where the combustion engine portion of the DHE 11 is off. The term "optimal" as used above is generally rooted in an engine operating case having the lowest overall power loss while still achieving the setpoints and constraints of the setpoint reception block 143 and the constraint reception block 153, respectively.

Figure 7:
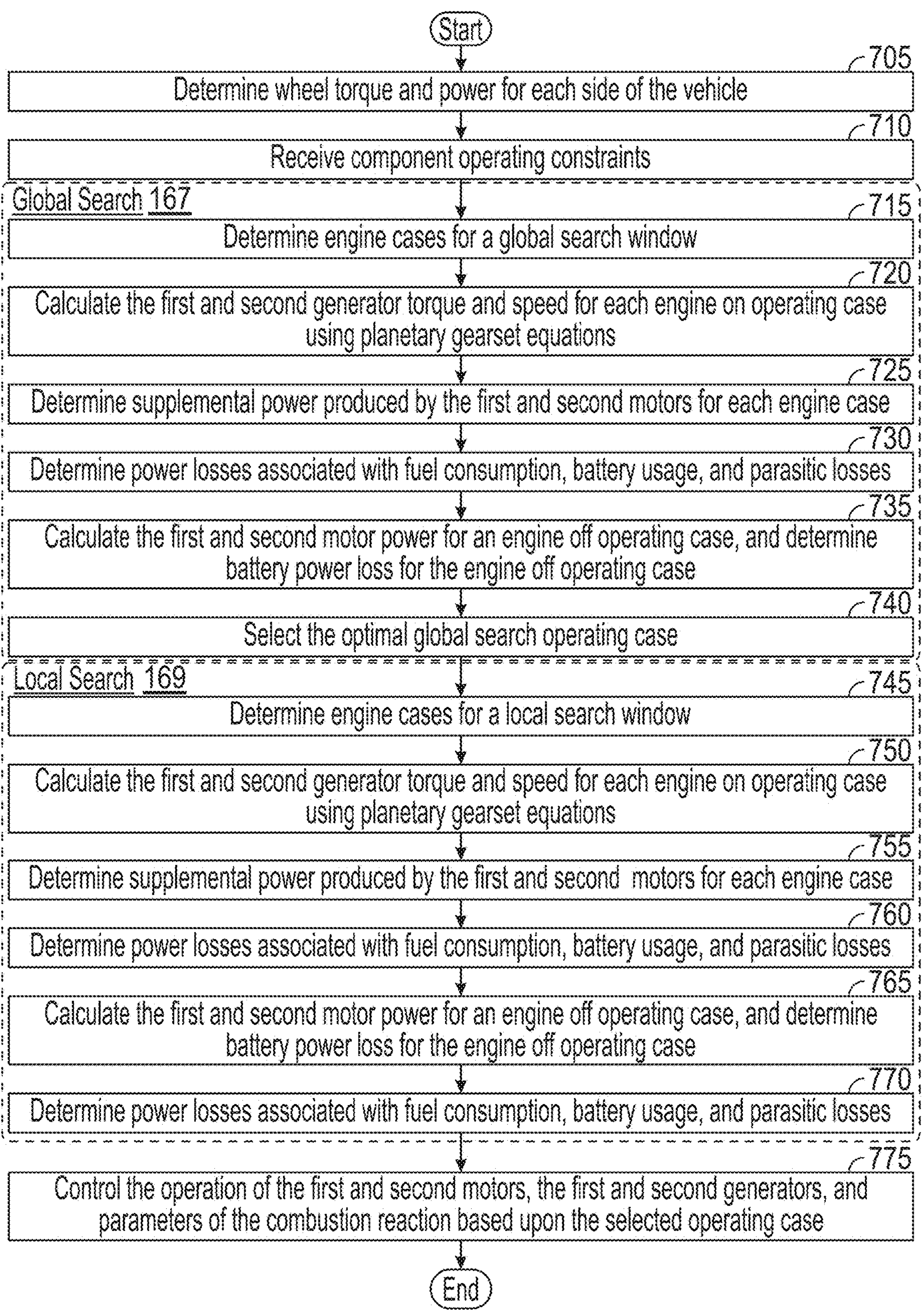
FIG. 7 depicts a flowchart of a method in accordance with one or more embodiments of the present disclosure.

The general process performed by the operating case determination block 165 is detailed in FIG. 7. Briefly, the process involves determining the engine cases for the global search window using the global search block 167. The global search block 167 proceeds to calculate the combustion provided power (if the contemplated case is an "engine on" case), and further calculates the torque and speed from the generator coils 51,53 and the motor coils 43,45 using planetary gearset equations. Subsequently, the global search block 167 determines the system power losses. This process is repeated for each engine operating case in the global search window. The global search window is refined to a local search window based on the results of the global search block 167, and the process is repeated in the local search window with the use of the local search block 169.

The output of the local search block 169 is an engine operating case including operating conditions for the components controlled by the ECU 109 as discussed above in relation to FIG. 4. The output engine operating case has the lowest net power consumption or highest net power gain, and both the global and local engine operating cases are determined using the Brake Specific Fuel Consumption (BSFC) line of the DHE 11. In general, BSFC relates to the amount of fuel consumed compared to the power output of the engine, such that a low BSFC indicates high engine efficiency. As is commonly known in the art, engine output power provided by a combustion reaction is mathematically related to the output engine torque and the rotation speed of a crankshaft (i.e., the crankshaft 13). Thus, the global search performed by the global search block 167 is rooted in multiplying torque and rotation speed values that are identified to occupy the BSFC line, as the BSFC line represents possible torque and speed operating points for the DHE 11. The global search and local search processes are further discussed in relation to FIGS. 6 and 7, below.

As discussed above, the global search block 167 and the local search block 167 both contemplate engine operating cases where the combustion engine portion is off and the combustion engine portion is on. The optimal engine off case and the optimal engine on case determined by the local search block 169 are each passed to the mode selection block 173. The engine operating case having the lowest total power loss is output as the selected engine operating case by mode selection block 173 to the control request block 175.

Prior to selecting the engine operating case, the mode selection block 173 applies a state bias to either the engine on operating case or the engine off operating case. The state bias accounts for a perceived inconvenience associated with stopping or restarting the combustion reactions with the combustion engine portion of the DHE 11. More specifically, it has been observed that vehicle drivers experience mild irritation when a combustion engine is automatically stopped. This is partially due to the noticeable power lag experienced by the driver when the combustion engine is restarted, such that the vehicle may appear to "jerk" when the combustion power is provided in addition to the electrical power. The value of the state bias depends on the time elapsed since the last combustion reaction in the DHE 11, as well as whether the combustion engine portion of the DHE 11 is currently operational (i.e., a current operating state of the vehicle 95). That is, if the combustion engine portion of the DHE 11 is currently operational, the state bias is applied to the engine off case, and vice versa. The state bias is also lessened over time, such that when the DHE 11 switches states between the engine off and engine on operating cases (or vice versa) the state bias has a relatively high value, and as time elapses since the switch the state bias is gradually degraded. In turn, the state bias dissuades the control algorithm 187 from selecting an operating case that changes the current DHE 11 operating state in order to increase user convenience. Typical values for the state bias range from 10 Kw to 0 Kw, inclusive, although the range may increase depending on the capacity of the battery 97 and similar considerations. After determining applying the state bias to the engine on operating case or the engine off operating case, the mode selection block 173 selects and outputs the engine operating case having the lowest net power consumption or highest power gain to the control request block 175.

The control request block 175 is formed of a plurality of blocks that function to control components of the vehicle 95. Specifically, the control request block 175 includes a motor control block 179, a generator control block 181, an engine control block 183, and a brake control block 185, which are discussed in detail below. Although the control request block 175 forms a portion of the control algorithm 187, the constituent blocks of the control request block 175 are discussed below in terms of hardware and software so as to convey real world impacts of the control algorithm 187.

The motor control block 179 and the generator control block 181 function as Motor Control Units (MCUs) to facilitate power transfer to and from each side of the DHE 11. The motor control block 179 and the generator control block 181 are each formed as software configured to control the power transmitted to and from connected components. The specific physical structure receiving instructions from the motor control block 179 and the generator control block 181 will depend on the structure of the connected components, but typically includes inverters (in Alternating Current (AC) power transmission) or converters (in Direct Current (DC) power transmission), among other components. Software algorithms employed by the motor control block 179 and the generator control block 181 include motor drivers, Pulse Width Modulation (PWM) controls, power conversion processes, and communication protocols. Power output by the DHE 11 is facilitated by the motor control block 179 controlling an amount of power transmitted to each of the first motor coil 43 and the second motor coil 45. Conversely, power input to the DHE 11 is facilitated by the generator control block 181 controlling the amount of power received from each of the first generator coil 51 and the second generator coil 53. The amount of power transmitted to each motor coil 43, 45 and received from the generator coils 51, 53 is determined by the operating case determination block 165 as discussed above.

The engine control block 183 functions to control parameters of the combustion reaction of the DHE 11. As noted above, combustion parameters are controlled and facilitated by actuating the spark plug assemblies 71, the fuel injector(s) 141, and the throttle 139, among other components. Thus, controlling combustion parameters by way of the engine control block 183 is realized by the engine control block 183 providing operating instructions to the aforementioned combustion related components. Such operating instructions include, for example, an actuation timing and an actuation duration provided to each component.

As one example, operating instructions transmitted to the spark plug assemblies 71 includes the engine control block 183 controlling a timing circuit of an ignition coil (not shown) of the DHE 11 that is connected to the spark plug assemblies 71 at a desired crankshaft 13 angle or operating time. Similarly, controlling the fuel injectors 141 includes the engine control block 183 actuating a fuel relay (not shown) at specific times based on a desired crankshaft 13 angle or operating time. The operating instructions are determined based upon the desired engine operating case output by the operating case determination block 165, such that the combustion components are actuated to achieve combustion at a desired BSFC as discussed further below. It will be appreciated to a person of ordinary skill in the art that routine electrical components such as the ignition coil and the fuel relay, among other components, have been omitted from the Figures for the sake of visual clarity, and their omission in the Figures does not require or suggest a lack of these components in a production model of the DHE 11.

Finally, the brake control block 185 functions to control mechanical brakes (not shown) of the vehicle 95. Although the primary method of reducing the speed of the vehicle 95 involves capturing excess energy with the generator coils 51, 53, and motor coils 43, 45, it may not be possible to completely stop the vehicle 95 solely by way of the generator coils 51, 53. For example, if a driver of the vehicle 95 encounters a moving obstacle, such as wildlife crossing a road, it may be necessary to apply mechanical brakes of the vehicle 95 to absorb energy not captured by the generator coils 51, 53 when the vehicle 95 is halted. As a result, the brake control block 185 transmits operating instructions to mechanical components of the vehicle 95 such as an electronic service brake (not shown) as a secondary effort to reduce the overall speed of the vehicle 95.

Figure 6:
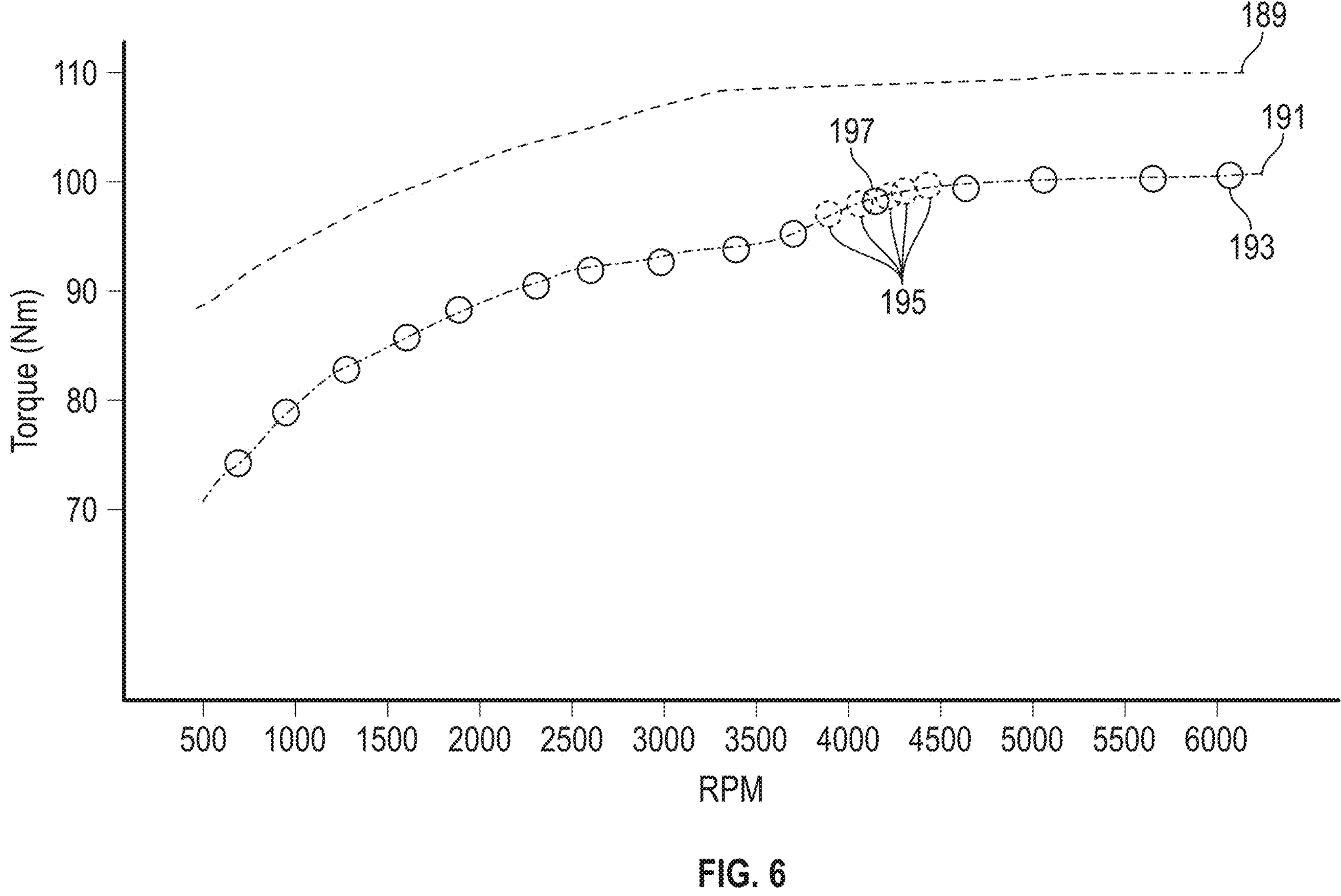
FIG. 6 depicts a torque versus engine speed plot in accordance with one or more embodiments of the present disclosure.

Turning to FIG. 6, FIG. 6 depicts a plot visually illustrating the global and local search points utilized by the operating case determination block 165. The plot of FIG. 6 compares engine torque in terms of Newton-meters (Nm) to engine speed in Rotations Per Minute (RPM). In this case, engine torque refers to torque at the output of the crankshaft 13 (i.e., at the first epicyclic geartrain 19 and the second epicyclic geartrain 21), and engine speed refers to the rotation speed of the crankshaft 13.

In general, FIG. 6 depicts two lines: a maximum torque line 189 and a Brake Specific Fuel Consumption (BSFC) BSFC line 191. The maximum torque line 189 illustrates the maximum torque output of the crankshaft 13 of the DHE 11, such that engine operating cases that involve torques above the maximum torque line 189 are not considered by the operating case determination block 165. The BSFC line 191 is an intrinsic characteristic of an engine, and relates to an amount of fuel that must be combusted to elicit a particular power output of the crankshaft 13. In this regard, the BSFC line is determined by measuring the fuel consumption of an engine and dividing the fuel consumption by the engine output power, where the measurements may be performed with the aid of a dynamometer. The operating case determination block 165 calculates the maximum power provided by each of the components of the DHE 11 for torque and speed combinations occupying the BSFC line 191 as discussed further below. Because a single BSFC value is applicable to multiple combinations of engine speeds and torques, the BSFC line 191 reflects a single BSFC value, and the combinations of torque and engine speed that achieve the desired BSFC value.

Continuing with FIG. 6, the global search block 167 of the operating case determination block 165 determines global search points 193 occupying the BSFC line 191. In this regard, the global search block 167 calculates a plurality of engine operating cases defined in terms of torque and engine speed that achieve the BSFC of the BSFC line 191. The torques and engine speeds are defined in predetermined intervals, such that the global search points 193 are evenly spaced along the BSFC line 191. For each of the global search points 193, the global search block 167 determines the combustion provided power and crankshaft 13 speed for each search case. Based on the combustion provided power and crankshaft 13 speed, as well as the rotation speed of the motor coils 43, 45, the global search block 167 determines an amount of power generated by the actuation of the generator coils 51, 53.

The determination of the amount of power provided by actuating the generator coils 51, 53 involves the use of planetary gearset calculations. As discussed in relation to FIG. 1, the first generator coil 51, the first motor coil 43, and a first side of the crankshaft 13 are interconnected by way of the first epicyclic geartrain 19. Similarly, the second generator coil 53, the second motor coil 45, and the second side of the crankshaft 13 are interconnected by way of the second epicyclic geartrain 21. The first epicyclic geartrain 19 and the second epicyclic geartrain 21 are formed as planetary gearsets, such that the rotation of the generator coils 51, 53 is mechanically linked to the rotation of the motor coils 43, 45 and the crankshaft 13. Thus, the rotation speed of the generator coils 51, 53 is determined based on the rotation speed of the crankshaft 13 and the motor coils 43, 45, as well as the number of teeth of the first ring gear 55, the second ring gear 57, the first sun gear 47, the second sun gear 49, the first hub 39, and the second hub 41. A general formula representative of the planetary gearset equation is provided as equation 1 below:

$$W_{gen} = w_{crankshaft} * \left(\frac{Z_r}{Z_s} + 1\right) - \frac{W_{motor} * Z_r}{Z_s * G_r} \quad (1)$$

In equation 1, $W_{gen}$ is the rotation speed of a particular generator coil 51, 53. $W_{crankshaft}$ is the rotation speed of the crankshaft 13. $W_{motor}$ is the rotation speed of the motor coil 43, 45 on the same side of the DHE 11 as the particular generator coil 51, 53. Because the motor coil 43, 45 is fixed to the respective hub 39, 31, $W_{motor}$ is assumed to be equivalent to the desired wheel 27, 29 speed, which is in turn derived from the driver requested acceleration or braking. $Z_r$ is a value denoting the number of teeth of the ring gears 55, 57 of the first epicyclic geartrain 19 and the second epicyclic geartrain 21. Similarly, $Z_s$ is the number of teeth of the first sun gear 47 and the second sun gear 49, which is connected to the first sun gear shaft 63 and the second sun gear shaft 65, respectively. Finally, $G_r$ is the gearing ratio between the planet gears 35, 37, and the ring gears 55, 57. Thus, based upon the number of teeth of the planet gears 35, 37, the sun gears 47, 49, the ring gears 55, 57, and the rotation speed of the crankshaft 13 and the motor coils 43, 45, the rotation speed of the generator coils 51, 53 can be determined. The resulting rotation speed $W_{gen}$ is subsequently multiplied by the power split derived from the steering wheel position sensor 137 to determine the rotation speed of a particular generator disposed on an associated side of the vehicle 95.

Based upon the rotation speed of the generator coils 51, 53 and the physical structure of the generator coils 51, 53 (i.e., the number of windings per generator coil, among other considerations), the power output provided by the generator coils 51, 53 is determined using trivial calculations. It is noted that equation 1 is applicable to determining the power output for a single side of the DHE 11, and the calculation is performed for each side of the DHE 11 for each engine operating case. In this regard, the crankshaft 13 speed will remain the same regardless of which side of the DHE 11 is analyzed, but the power provided to the each side of the DHE 11 will vary if the vehicle 95 is turning to account for different wheel rotation speeds as discussed above. Thus, the operating case determination block 165 assumes that the combustion power provided by the DHE 11 for a particular side is equivalent to the maximum combustion provided power multiplied by the power split.

For example, and as discussed above, a steering wheel position sensor 137 may indicate a steering force value of 30%, indicating that the vehicle 95 is turning to the left. As a result of the 30% steering force value, the operating case determination block 165 assumes that 30% of the combustion power provided by the DHE 11 is transmitted to the left side of the DHE 11 (i.e., the first epicyclic geartrain 19). The operating case determination block 165 further assumes that the remaining 70% of combustion power is assumed to be transmitted to the right side of the DHE 11 (i.e., the second epicyclic geartrain 21).

There are also limits to the torque produced by the generator coils 51, 53, as the generator coils 51, 53 are mechanically connected to the crankshaft 13. If the generator torque is less than a requisite value (determined based on the DHE 11 structure), then the crankshaft 13 torque will exceed the generator coil 51, 53 torque, and the crankshaft 13 speed will increase above the target speed. Thus, the operating case determination block 165 may restrict operating cases that do not have a minimum generator coil 51, 53 provided torque. The minimum torque provided by each generator coil 51, 53 is defined by the following equation 2:

$$T_{gen} = \left(-\frac{Z_s}{Z_s + Z_r}\right) * T_{crankshaft} * P_{split} + T_{control} \quad (2)$$

Where $T_{gen}$ is the generator coil 51, 53 torque, $T_{crankshaft}$ is the crankshaft 13 torque, $P_{split}$ is the power split, and $T_{control}$ is an operator or manufacturer provided adjustment value to ensure that equation 2 provides a minimum generator coil 51, 53 torque when the crankshaft 13 speed is low.

In the event that there is no rotation of the steering wheel and the vehicle 95 is directed to maintain a linear course, only a single generator power value needs to be calculated (and doubled), as the same amount of power will be provided by each generator coil 51, 53. In turn, the omission of a second power calculation during linear motion of the vehicle 95 increases the processing speed of the control algorithm 187 as a whole. Thus, overall, for each engine operating case the power split of the DHE 11 is used to calculate the amount of combustion power and electrical power provided to each side of the DHE 11, and based on these calculations determine the maximum power generated by the generator coils 51, 53.

Continuing with FIG. 6, after performing the above described power calculations for each global search point 193 of the BSFC line 191, the operating case determination block 165 proceeds to determine an optimal global search point 197. This is performed by summing the power losses and gains for each engine operating case and comparing the engine operating cases to determine the engine operating case with the lowest net power loss. The operating case determination block 165 outputs the optimal global search point 197, and proceeds to determine local search points 195 by way of the local search block 169. The local search points 195 are operating cases occupying the BSFC line 191 adjacent to an optimal global search point 197. The local search points 195 are located within a predetermined distance from the optimal global search point 197. For example, and as shown in FIG. 6, the optimal global search point 197 is located at a crankshaft 13 speed of approximately 4,250 RPMs. As a result, the local search points 195 are located within +/−250 RPMs from the optimal global search point 197, such that the local search points 195 occupy a window spanning from 4,000 RPMs to 4,500 RPMs. The local search points are also spaced apart at a predetermined interval, which is 100 RPMs in the case of FIG. 6. Thus, FIG. 6 depicts a total of five local search points 195 adjacent to the optimal global search point 197. The number of global search points 193 and local search points 195, the spacing thereof, and similar parameters may be varied at the discretion of an operator or system engineer without departing from the nature of this disclosure.

After the local search points 195 are identified, an engine operating case is determined for each of the local search points 195. The operating cases associated with the local search points 195 are compared by the local search block 169, and the operating case having the lowest net power loss or highest net power gained is output as an optimal engine on operating case. As discussed in relation to FIG. 5, the operating case determination block 165 proceeds to compare the optimal engine on operating case from the local search block 169 to an engine off operating case determined by the block 171, and outputs the operating case with the lowest net power loss as the optimal engine operating case to the mode selection block 173.

In alternative embodiments, the operating case determination block 165 may include a search algorithm in lieu of the global search block 167 and local search block 169. Such an algorithm may be embodied as a brute force algorithm that iteratively determines engine operating cases, a multi-objective optimization algorithm (i.e., Pareto optimization), a neural network, and similar algorithms as will be appreciated by a person skilled in the art. Embodiments described herein, including alternative embodiments, may be implemented using serial or parallel processing, depending on ECU 109 hardware constraints and various other design considerations.

Turning to FIG. 7, FIG. 7 depicts a method for operating a hybrid machine as described in one or more embodiments of this disclosure. Steps of the flowchart shown in FIG. 7 may be performed with components such as a vehicle 95 employing a DHE 11 as described herein, but are not limited thereto. The constituent steps of the method depicted in FIG. 7 may be performed in any logical order, and the method is not limited to the sequence presented. In addition, multiple steps of the method of FIG. 7 may be performed with a single physical action, or multiple actions may occur within a single step of the method without departing from the nature of this disclosure.

The method of FIG. 7 initiates with step 705, which involves determining the wheel power and wheel torque for each side of the vehicle 95. The overall wheel torque is determined with a control algorithm 187 by receiving a user requested torque by way of the accelerator pedal position sensor 133. Requested power is determined by multiplying the requested torque by the current speed of the vehicle 95. The requested torque and power is multiplied by the power split derived from the steering force value received from the steering wheel position sensor 137, which provides the amount of power and torque to each side of the vehicle 95. Based upon the steering force value, the DHE 11 ultimately provides more power to an inner wheel during a cornering maneuver than the outer wheel using a combination of the motor coils 43, 45, and the generator coils 51, 53, causing the vehicle 95 to turn.

Once the wheel torque and power is determined for each side of the vehicle 95, the method of FIG. 7 proceeds to step 710. In step 710, the ECU 109 receives constraints of the components of the vehicle 95. The constraints are received in a constraint reception block 153 as discussed above in relation to FIG. 5. Constraints may be determined or set by a system operator or engineer based on the physical design of the component or its interactions with other components, among other considerations, and are stored on a memory 125 of the ECU 109. Operating constraints are provided for the generator coils 51, 53 by way of the generator constraint block 155, while operating constraints for the motor coils 43, 45 are provided by way of the motor constraint block 157. As one example of an operating constraint for the aforementioned electrical components, the motor constraint block 157 of the constraint reception block 153 functions to store and receive the current, voltage, and power input limits of the first motor coil 43 and the second motor coil 45. Continuing with the example, the aforementioned input limits are determined based on design considerations such as the number of windings of the motor coils 43, 45, the size of wire forming the windings, and similar considerations as will be appreciated by a person of ordinary skill in the art.

Battery 97 related operating constraints, which involve recharge and discharge limits, are provided by and stored in the battery constraint block 159. Combustion related constraints are provided by the engine constraint block 161, which includes operating limits such as a maximum output crankshaft 13 torque and speed, among other limitations. Finally, the auxiliary constraint block 163 stores operating limits related to other subsystems of the vehicle 95 that are not accounted for by the previously described constraint blocks. Once the constraints for components of the vehicle 95 are received in the constraint reception block 153, the method proceeds to step 715.

In step 715, the ECU 109 determines global search points 193 occupying a global search window. The global search window is an ideal Brake Specific Fuel Consumption (BSFC) line 191. The BSFC line is a combination of torques (in Newton meters (Nm)) and engine speeds (in Rotations Per Minute (RPMs)) that achieve a desired combustion output power with the indicated fuel consumption. A dynamometer and/or mathematical equations may be used to determine the BSFC line 191 based upon the structure and configuration of the DHE 11. Torques and speeds of the crankshaft 13 that provide the same amount of power as the identified test case form the BSFC line 191. Thus, global search points 193 occupying the BSFC line 191 each identify a specific torque and rotation speed of the crankshaft 13 that may be achieved using a minimum fuel flow. The global search points 193 are spaced apart in routine intervals as determined by an operator or system engineer. As a general example, an interval of 500 RPMs between global search points 193 has sufficient granularity for the global search, although this value may be modified based on the processing speed of the ECU 109, among other considerations. Alternatively, the interval may include a range of evenly spaced power values determined by multiplying torques and speeds such that the global search points 193 are spaced apart based upon their associated power output rather than rotation speed.

Part of the process of identifying a global search point 193 is calculating the combustion provided power associated with the global search point 193. As is commonly known in the art, engine power is mathematically related to the engine torque and engine speed. Thus, determining the combustion provided power for each global search point 193 involves the ECU 109 multiplying the engine torque and engine speed with a conversion factor to determine the maximum combustion power for each engine operating case identified by a global search point 193. Once the global search points 193 are identified on the BSFC line 191 and the combustion provided power is calculated for each engine operating case associated with a global search point 193, the method proceeds to step 720.

In step 720, the ECU 109 calculates the torque provided to each of the generator coils 51, 53 using a planetary gearset equation. An example of the planetary gearset equation is provided as equation 1, above. The planetary gearset equation has inputs of the crankshaft 13 speed and the motor coils 43, 45 speed, as well as the gearing ratios between the planet gears 35, 37, the sun gears 47, 49 and the ring gears 55, 57. Based on the aforementioned inputs, the ECU 109 utilizes Equation (1) to determine the power generated from the generator coils 51, 53 for each of the global search points 193. Once the power generated is determined for each engine operating case, the method proceeds to step 725. As described above, the engine operating cases are engine operating parameters associated with the particular torque and rotation speed identified by a corresponding global search point 193.

In step 725, the power provided by each of the motor coils 43, 45 is determined for each engine operating case identified by the global search points 193. Because the combustion provided power is determined in step 715 and the power generated from the generator coils 51, 53 is determined in step 720, step 725 involves subtracting these values from the wheel power determined in step 705. That is, the power provided to the motor coils 43, 45 is determined to be a net power remaining after accounting for the combustion provided power and the generator coil 51, 53 power generated. A separate calculation is performed for each side of the vehicle 95 in cases where the steering force value is not equal to 50%. Once the power provided to each of the motor coils 43, 45 is determined in step 725, the method proceeds to step 730.

Step 730 includes determining auxiliary power losses for each engine operating case identified by a global search point 193. The auxiliary power losses include fuel consumption losses, battery 97 losses, and parasitic losses as discussed further below. Fuel consumption losses are determined for each engine operating case by multiplying the BSFC with the combustion power output associated with the particular operating case and with related conversion factors. The related conversion factors include a fuel-to-energy conversion coefficient and a fuel efficiency coefficient that are determined or selected by an operator or system engineer.

Battery 97 losses broadly encompass power losses and gains to the battery 97 as a consequence of the actuation of the motor coils 43, 45 and the generator coils 51, 53. The power flow in and out of the battery 97 is calculated by summing the power provided to each of the motor coils 43, 45 with the power generated by the generator coils 51, 53, and dividing the summation by the efficiency of the battery. Furthermore, the total power loss experienced by the battery 97 is determined by summing the amount of power provided to individual components of the DHE 11. As noted above, power loss relates to the loss of power due to inefficiencies of the DHE 11, and the phrase "power" relates to power produced by the combustion engine portion of the DHE 11, generated electrical power produced by the generator coils 51, 53, regenerative braking power provided by the motor coils 43, 45, and tractive power provided by the DHE 11 to the wheels 27, 29.

The battery power loss is subsequently multiplied by a situation multiplier that relates to the battery 97 health. The situation multiplier is less than 1 when the vehicle 95 operating conditions imply that it would be advantageous to discharge the battery 97, whereas situation multipliers greater than 1 are applicable when it is disadvantageous to provide electrical power with the battery 97. As one example, the wheels 27, 29 may require 30 Kw of power, the vehicle 95 is traveling at 80 Kilometers Per Hour (km/h), the battery 97 has 50% remaining capacity, and a target battery capacity (set by an operator or system engineer) for a vehicle 95 speed of 85 km/h is 55% remaining capacity. Since it is disadvantageous to discharge the battery 97 below the target battery capacity, the situation multiplier for this case will be 1.8. For an operating case where the combustion provided power is 20 Kw and the battery 97 efficiency is 90%, a theoretical total of 11 Kw (10 Kw of power output and 1 Kw lost to inefficiency) must be provided as power loss out of the battery 97 for that particular engine case. The 11 Kw value is multiplied by the situational multiplier of 1.8, and the battery loss 97 for the example operating case is determined to be 19.8 Kw of power.

Parasitic losses include power loss to driver requested vehicle 95 features such as an Air Conditioning (AC) system (not shown) and an audio system (not shown), among other examples. The specific determination of power losses to parasitic power drains varies according to the specific design of the vehicle 95 and its included subsystems. Typical values for parasitic power drains are a 0%-45% loss of efficiency. Parasitic losses may further include losses to auxiliary components such as emissions control systems (not shown) and Exhaust Gas Recirculation (EGR) subsystems (not shown), and losses due to Noise, Vibration, and Harshness (NVH) associated with the vehicle 95. Once the fuel consumption losses, battery 97 losses, and parasitic losses are determined in step 730, the method proceeds to step 735.

In step 735, the power provided by the motor coils 43, 45 and the generator coils 51, 53 is determined for an engine off case. As noted above, engine off operating cases encompass power provided to the motor coils 43, 45, power provided to the generator coils 51, 53, generated electrical power received from the generator coils 51, 53, and regenerative braking electrical power provided by the motor coils 43, 45. Thus, step 735 includes determining engine off operating cases that provides the requested torque delivery using power provided to or generated by the motor coils 43, 45, and power provided to or generated by the generator coils 51, 53. The engine off operating case having the lowest net power consumption or highest net power gain is output as the selected engine off operating case in step 740. Once the engine off operating case is selected in step 740, the method proceeds to step 745.

In step 745, the global search window (i.e., a majority or entirety of the BSFC line 191) is refined to a local search window. The refinement of the global search window includes summing the power losses and gains determined in steps 715-730 for each engine operating case. Once summed, the engine operating case having the lowest overall power loss is selected as an optimal global search point 197. Identification of the local search points 195 is completed by identifying a plurality of evenly distributed points within a predetermined engine speed interval from the optimal global search point 197. For example, if the optimal global search point 197 is determined to be 2,000 RPM, the local search points 195 will be even spaced in 50 RPM increments from engine speeds of 1,725 RPMs to 2,250 RPMs (i.e., a 500 RPM local search window). For each local search points 195, combustion provided power is determined by multiplying the associated engine speed and engine torque with conversion factors, and the remaining calculations of steps 720-735 are repeated for each local search point 195. After determining the operating parameters for each engine operating case associated with the local search points 195, the method proceeds to step 750. The determination of the local search points 195 and associated engine operating parameters is performed with a local search block 169 of the control algorithm 187.

Steps 750, 755, 760, 765, and 770 mirror steps 720, 725, 730, 735, and 740 discussed above, but are performed in the local search window instead of the global search window. Thus, step 750 involves calculating the torque and speed of each generator for each engine on operating case using the planetary gearset equations. In step 755, supplemental power produced by the first and second motors is determined for each engine on operating case. Step 760 involves determining power losses associated with fuel consumption, batter usage, and parasitic losses. Step 765 includes determining motor power and generator power, including power losses and power gains, for an engine off operating case.

In step 770, the mode selection block 173 of the control algorithm 187 outputs a desired engine operating case. The desired engine operating case is the engine operating case having the lowest power consumption or highest net power gain overall. Once the desired engine operating case is selected in step 790, the method proceeds to step 800 where components of the DHE 11 are actuated based on the selected engine operating case. Controlling components of the DHE 11 is enacted using the control request block 175, which includes a motor control block 179, a generator control block 181, an engine control block 183, and a brake control block 185. Specific methods of controlling the components are described above in relation to FIG. 5, and are not repeated for the sake of brevity. Thus, the method depicted in FIG. 7 ends with controlling the components of the DHE 11 to enact the desired engine operating case.

Figure 8:
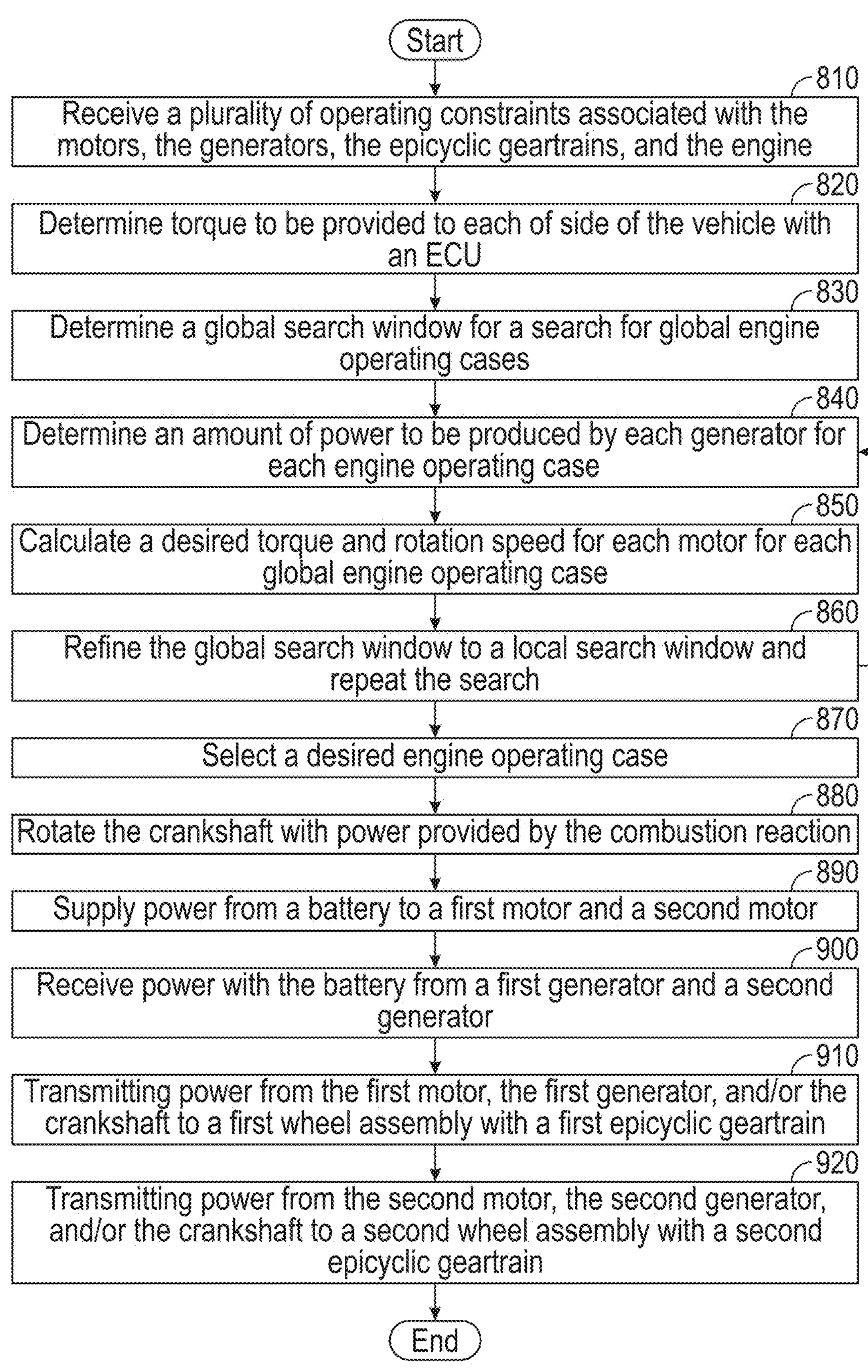
FIG. 8 depicts a flowchart of a method in accordance with one or more embodiments of the present disclosure.

Turning to FIG. 8, FIG. 8 depicts a method for operating a hybrid machine such as, but not limited to, a vehicle 95 including a DHE 11. Similar to the method of FIG. 7, the constituent steps of the method depicted in FIG. 8 may be performed in any logical order, and the method is not limited to the sequence presented. In addition, multiple steps of the method of FIG. 7 may be performed with a single physical action, or multiple actions may occur within a single step of the method without departing from the nature of this disclosure.

The method of FIG. 8 initiates with step 810, which includes receiving operating constraints for components of the DHE 11 with a constraint reception block 153 of the control algorithm 187. The operating constraints include motor operating constraints associated with a first motor formed by the first hub 39 and the first motor coil 43 and a second motor formed by the second hub 41 and the second motor coil 45. The operating constraints further include generator operating constraints associated with a first generator formed by the first sun gear shaft 63 and the first generator coil 51 and a second generator formed by the second sun gear shaft 65 and the second generator coil 53. Operating constraints received for the first epicyclic geartrain 19 and the second epicyclic geartrain 21 include gearing ratios between the planet gears 35, 37, the sun gears 47, 49, and the ring gears 55, 57. Combustion reaction related operating constraints include the maximum rotation speed, torque, and power output of the crankshaft 13, as well as operating constraints associated with the spark plug assemblies 71, the throttle 139, and the fuel injector 141. The first motor, the first generator, and a first side of the crankshaft 13 are interconnected by way of a first epicyclic geartrain 19 disposed on a first side of a DHE 11, and thus a first side of a vehicle 95. The second side of the vehicle 95 and, thus, the second side of the DHE 11 includes the second motor, the second generator, a second side of the crankshaft 13, and the second epicyclic geartrain 21.

Step 820 includes determining torque and power to be provided to each side of the vehicle 95 with the ECU 109. The torque request is received by an accelerator pedal position sensor 133 that is connected to an accelerator pedal (not shown) actuated by a user of the vehicle 95. After receiving the torque request, the ECU 109 receives a steering force value from a steering wheel position sensor 137.

A brief, nonlimiting example of determining the power provided to each side of the vehicle 95 is provided below. The below example serves only to establish the capability of the control algorithm 187 to determine power provided to a particular side of the vehicle 95 and is not exhaustive or all encompassing. As one example of calculating provided power to a particular side of the vehicle 95, the steering wheel position sensor 137 outputs a percentage from 0%-100%, inclusive, representing the degree of actuation of a steering wheel (not shown) of the vehicle 95 by a user. A value of 0% indicates that the steering wheel is actuated to its fullest counterclockwise position, whereas a value of 100% indicates that the steering wheel is actuated to its fullest clockwise position. A value of 50% indicates that the steering wheel is in a neutral position and the vehicle 95 should continue along a linear path. Intermediate values between 0%-50% and 50%-100% (not inclusive) indicate partial actuation of the steering wheel in the corresponding direction.

By multiplying the steering force value by the torque request, the torque provided to by the first side of the vehicle 95 is determined. Torque provided to the second side of the vehicle 95 is determined by multiplying the remainder of the steering force value (i.e., a value obtained by subtracting the steering force value from 1) by the torque request. As described herein, the steering force value is also referred to as a power split, as the degree of actuation of the steering wheel directly corresponds to the amount of power provided to the wheels 27, 29. In addition, the wheel speed of the vehicle 95, which is equivalent to the overall speed of the vehicle 95, is assumed to be equivalent to the current speed of the vehicle 95 for power calculations. Thus, by multiplying the torque request by the current vehicle speed, the power split, and associated conversion factors, then the power provided to each side of the vehicle 95 by the DHE 11 is determined.

In step 830, the ECU 109 determines a global search window for global engine operating cases using a global search block 167 of a control algorithm 187. The global search points 193 are disposed along the BSFC line 191. Each global search point 193 represents a specific engine speed and torque combination, and associated operating parameters (e.g., combustion timing parameters such as spark timing and fuel usage) for actuating the combustion portion of the DHE 11. The global search points 193 may be a predetermined number of global search points 193 evenly distributed along the BSFC line 191, or global search points 193 may be dispersed in intervals at predetermined rotation speeds of the crankshaft 13, for example. Once the global search points 193 identified for the BSFC line 191, the method proceeds to step 840.

Step 840 includes determining an amount of power produced by each generator of the vehicle 95. A first generator is formed by a first sun gear shaft 63 surrounded by a first generator coil 51 and a second generator is formed by a second sun gear shaft 65 and a second generator coil 53. The torque produced by each of the first generator and second generator is determined using equation 2, above, and the rotation speed of each generator is determined using equation 1, above, which are examples of planetary gearset equations as described herein. Once the rotation speed and torque are calculated for each of the first generator and the second generator, the power generation achieved by each generator is determined by multiplying the rotation speed with the torque and associated unit conversion factors. Because the rotation speed and torque requirements of the vehicle 95 are adapted based on the power split in step 820, the power provided by each generator is naturally adapted based on the power split as well. The power provided by each generator is determined for each of the engine operating cases determined in step 830, at which point the method proceeds to step 850.

Once the generator provided power for each generator is calculated in step 840, the power provided by each motor is calculated by the ECU 109 in step 850. Because the power requirement for each side of the vehicle 95 is determined in step 820, the combustion provided power is determined for each engine operating case in step 830, and the power generation provided by the generators is determined in step 840, step 850 includes summing the power losses and gains to determine the remaining unaccounted power. The remaining unaccounted power is provided by the first motor and the second motor based on the power split, such that the entirety of the unaccounted power is provided by the first motor and the second motor. This process is also performed for each engine operating case identified by a global search point 193, such that each engine operating case is associated with: specific combustion parameters and a combustion provided power output, power loss to each motor, and power generation from each generator.

After determining the operating parameters for each engine operating case, auxiliary power losses and penalties are applied to the engine operating cases. Auxiliary power losses include power provided to an Exhaust Gas Recirculation (EGR) or catalytic conversion subsystem, for example, and power losses to user convenience equipment such as Air Conditioning (AC) systems. Penalties include low battery capacity penalties applied to cases where the battery 97 capacity drops below a predetermined target value, as well as the state bias that reflects a user inconvenience experienced when stopping and restarting the combustion portion of the DHE 11 as described above.

In step 860, the global search window is refined to a local search window, and the search for local search points 195 is performed. To refine the global search window, the ECU 109 evaluates the identified engine operating cases associated with the global search points 193, and selects an engine operating case having the lowest power consumption as an optimal global search point 197. The local search points 195 are located within a predetermined power range or rotation speed range from the optimal global search point 197, such that the optimal global search point 197 is centered between the local search points 195. The predetermined power range may be, for example, +/−10 Kw and the predetermined speed range may be +/−250 RPMs above or below the optimal global search point 197, although these values may vary based on the design of the DHE 11 or at an operator's or system engineer's discretion. Once the local search points 195 are identified, the combustion provided power is determined for each local engine operating case associated with a local search point 195 by multiplying the particular torque and speed associated with the local engine operating case with conversion factors. Subsequently, steps 840 and 850 are repeated for each local engine operating case to determine the power consumed or produced by the first motor, the second motor, the first generator, and the second generator at the associated torque and speeds. The local engine operating case search and resulting power calculations are performed with a local search block 169 of a control algorithm 187. Once the operating parameters are determined for each local engine operating case, the method proceeds to step 870.

In step 870, an engine operating case is selected by way of a mode selection block 173. In addition to the local engine operating cases determined by the local search block 169, the mode selection block 173 receives an engine off operating case provided by an engine off block 171. The determination of the engine off operating case parameters is discussed above, and is not repeated for the sake of brevity. The mode selection block compares the local engine operating cases from the local search block 169 and the engine off operating case from the block 171, and selects a desired engine operating case as the engine operating case having the least net power consumption. Once an operating case is selected as the desired engine operating case by the ECU 109, the method proceeds to step 880.

Step 880 includes rotating the crankshaft 13 with power provided by a combustion reaction generating power from a combustion reaction with an engine of a vehicle. As described herein, the DHE 11 forms one example of an engine configured to provide power by combusting a fuel, and the DHE 11 functions to generate vehicle 95 motion. Step 880 specifically includes providing fuel to a combustion chamber (not shown) of the DHE 11 with one or more fuel injectors 141. The fuel injector(s) 141 may be embodied as a single Port Fuel Injector (PFI) or a plurality of Gasoline Direct Injectors (GDIs), where the PFI is located in an intake manifold (not shown) affixed to the DHE 11 and the GDIs are disposed to inject fuel directly into the combustion chambers (not shown). Fuel provided by the fuel injector 141 is mixed with an air flow controlled by a throttle 139, and ignited with the use of spark plug assemblies 71 that create ignition arcs, or sparks, that ignite the fuel. The ignition of the fuel actuates pistons (not shown) connected to the crankshaft 13 by way of pushrods 75, causing the crankshaft 13 to rotate due to combustion provided power. It is noted that step 880 is optional insofar as combustion provided power may be unnecessary if the engine off operating case is selected in step 870.

Simultaneous to providing combustion power with the crankshaft 13, the ECU 109 controls the BMS 113 to transmit power to the first motor and the second motor in step 890. In general, the battery 97 provides power to the first motor coil 43 and the second motor coil 45 that causes the first hub 39 and the second hub 41 to rotate, respectively. The amount of power transmitted to the first motor coil 43 and the second motor coil 45 is determined based on the power split received from the accelerator pedal position sensor 133, and controlled by the power controller 117 of the BMS 113. Furthermore, and as determined according to the power split, the amount of power transmitted to the first motor may differ from the amount of power transmitted to the second motor while the vehicle 95 is turning.

Also simultaneous to steps 880 and 890, the battery 97 receives power from the first generator and the second generator in step 900. Specifically, the first generator coil 51 and the second generator coil 53 generate power when the first sun gear 47 and the second sun gear 49 are rotated, respectively. Power is transmitted from the generator coils 51 and the generator coils 53 to the battery 97 by way of a power line 103. The power received from each generator coil 51, 53, may differ for reasons discussed above.

Steps 910 and 920 are rooted in transferring power to the first wheel 27 and the second wheel 29, respectively. Step 910 involves transferring power to the first wheel 27 with the use of a first epicyclic geartrain 19 that interconnects the first motor coil 43, the first generator coil 51, and a first side of the crankshaft 13. The first epicyclic geartrain 19 includes a planetary gearset formed by a first sun gear 47, a first ring gear 55, and a first planet gear 35. The first sun gear 47 is fixed to a first sun gear shaft 63 and rotates within the first generator coil 51 based on motion provided by the crankshaft 13 and the first motor coil 43. The first ring gear 55 is fixed to the first hub 39, such that providing power to the first motor coil 43 causes the first hub 39 and the first ring gear 55 to rotate. The rotation speed of the first ring gear 55 is also a function of the power provided by the crankshaft 13 and transferred by the first carrier 31 to the first planet gear 35, and is further a function of power lost to the first generator coil 51 and transferred by the first sun gear 47 to the first sun gear shaft 63. The first hub 39, and thus the first epicyclic geartrain 19 overall, is connected to a first half shaft 23 that rotates the first wheel 27, completing step 910. As step 910 occurs as a result of motion provided by steps 880-900, step 910 is performed simultaneously or near simultaneously thereto.

Step 920 similarly involves transferring power to the second wheel 29 with the use of a second epicyclic geartrain 21. The second epicyclic geartrain 21 interconnects the second motor coil 45, the second generator coil 53, and a second side of the crankshaft 13 with the use of a planetary gearset formed by a second sun gear 49, a second ring gear 57, and a second planet gear 37. The second sun gear 49 is fixed to a second sun gear shaft 65 and rotates within the second generator coil 53 based on motion provided by the crankshaft 13 and the second motor coil 45. The second ring gear 57 is fixed to the second hub 41, such that providing power to the second motor coil 45 causes the second ring gear 57 to rotate as well. The rotation speed of the second ring gear 57 is also a function of the power provided by the crankshaft 13 and transferred by the second carrier 33 to the second planet gear 37, and is further a function of power lost to the second generator coil 53 and transferred by the second sun gear 49 to the second sun gear shaft 65. The second hub 41 of the second epicyclic geartrain 21, is connected to a second half shaft 25 that rotates the second wheel 29 as the output of step 920. As step 920 also occurs as a result of motion provided by steps 880-900, step 920 is performed simultaneously or near simultaneously thereto.

With power provided to the wheels 27, 29 by way of steps 910 and 920, the method of FIG. 8 completes with actuating the vehicle 95 using the DHE 11. Overall, the method of FIG. 8 functions to determine and control power provided to each side of the vehicle 95 using a power split received from the steering wheel position sensor 137. The method of FIG. 8 may be restarted or portions of the method repeated at routine intervals to continue driving the vehicle 95. For example, after a predetermined time has elapsed or a predefined action has occurred (e.g., the driver presses the accelerator pedal), the method may restart at step 820 to begin determining a new engine operating case.

Although only a few example embodiments have been described in detail above, those skilled in the art will readily appreciate that many modifications are possible in the example embodiments without materially departing from this invention. For example, although the disclosure implies that the DHE includes three combustion chambers (by virtue of having three distinct sparking assemblies), the DHE design may be adapted to any number of pistons and associated combustion chambers. Furthermore, the DHE may power the rear wheels of the vehicle rather than the front wheels. Moreover, the combustion chambers and spark plug assemblies of the DHE may be disposed in a "V" formation rather than an "inline" configuration as depicted. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A vehicle, comprising:

a crankshaft configured to rotate from power produced by a combustion reaction;

a first motor positioned on a first side of the vehicle and a second motor positioned on a second side of the vehicle, where each of the first motor and the second motor are configured to rotate when power is supplied thereto;

a first generator positioned on the first side of the vehicle and a second generator positioned on the second side of the vehicle, where each of the first generator and the second generator are configured to generate power when rotated;

a battery configured to supply power to the first motor and the second motor, and further configured to receive power from the first generator and the second generator;

a first epicyclic geartrain positioned on the first side of the vehicle configured to transmit power from at least one of the first motor, the first generator, and the crankshaft to a first wheel assembly positioned on the first side of the vehicle;

a second epicyclic geartrain positioned on the second side of the vehicle and configured to transmit power from at least one of the second motor, the second generator, and the crankshaft to a second wheel assembly positioned on the second side of the vehicle, and an Electronic Control Unit (ECU) comprising a memory and a processor, the ECU being configured to:

determine an amount of torque to be provided to each of the first side of the vehicle and the second side of the vehicle;

receive a plurality of operating constraints associated with the first motor, the second motor, the first generator, the second generator, and the crankshaft;

determine a global search window for a search for a plurality of global engine operating cases;

calculate, as part of the search, a desired torque and a desired rotation speed for each of the first motor and the second motor for each global engine operating case of the plurality of global engine operating cases;

determine, as part of the search, an amount of power to be produced by each of the first generator and the second generator and returned to the battery for each engine operating case;

select a desired engine operating case, and control the first motor, the second motor, the first generator, the second generator, and parameters of the combustion reaction based upon the selected desired engine operating case.

2. The vehicle of claim 1, wherein the ECU is further configured to determine a first motor power provided to the first motor and a second motor power provided to the second motor for an engine off operating case.

3. The vehicle of claim 2, wherein the ECU is further configured to determine a power loss of the battery for the engine off operating case.

4. The vehicle of claim 3, wherein the ECU is further configured to apply a state bias to one of: the engine off operating case and an engine operating case having a lowest power consumption based on a current operating state of the vehicle.

5. The vehicle of claim 4, wherein the state bias comprises a predetermined value representing a perceived inconvenience associated with stopping or restarting the combustion reaction.

6. The vehicle of claim 1, wherein the battery is configured to receive power from the first motor and the second motor.

7. The vehicle of claim 1, wherein the ECU is further configured to determine the amount of torque and the amount of power to be provided to each of the first side of the vehicle and the second side of the vehicle using planetary gearset equations based upon a driver torque request.

8. The vehicle of claim 1, wherein the ECU is configured to determine a power split that corresponds to the amount of power to be provided to each of the first side of the vehicle and the second side of the vehicle based upon a steering force value received from a steering wheel position sensor.

9. The vehicle of claim 1, wherein the ECU is further configured to refine the global search window to a local search window and repeat the search for a plurality of local engine operating cases occupying the local search window.

10. The vehicle of claim 9, wherein the search in the global search window and the search in the local search window are each performed on a Brake Specific Power Consumption (BSFC) power line such that each of the engine operating cases is uniquely associated with a torque value and a speed value.

11. A method, comprising:

receiving, with an ECU, a plurality of operating constraints associated with a first motor, a second motor, a first generator, a second generator, and power provided by a combustion reaction, where a first side of a vehicle comprises the first motor, the first generator, a first side of a crankshaft, and a first epicyclic geartrain, and a second side of the vehicle comprises the second motor, the second generator, a second side of the crankshaft, and a second epicyclic geartrain;

determining an amount of torque to be provided to each of the first side of the vehicle and the second side of the vehicle with the ECU;

determining a global search window for a search for a plurality of global engine operating cases with the ECU;

determining, with the ECU and as part of the search, an amount of power to be produced by each of the first generator and the second generator and returned to a battery of the vehicle for each engine operating case;

calculating, with the ECU and as part of the search, a desired torque and a desired rotation speed for each of the first motor and the second motor for each global engine operating case of the plurality of global engine operating cases;

selecting a desired engine operating case with the ECU;

rotating the crankshaft with power provided by the combustion reaction based on the desired engine operating case, where parameters of the combustion reaction are controlled by the ECU;

supplying power from the battery to the first motor and the second motor based upon the selected desired engine operating case, where each of the first motor and the second motor rotate when the power is supplied thereto;

receiving power, with the battery, from the first generator and the second generator based upon the selected desired engine operating case, where each of the first generator and the second generator generate the power when rotated;

transmitting a first amount of power from at least one of the first motor, the first generator, and the first side of the crankshaft to a first wheel assembly positioned on the first side of the vehicle with the first epicyclic geartrain, and transmitting a second amount of power from at least one of the second motor, the second generator, and the second side of the crankshaft to a second wheel assembly positioned on the second side of the vehicle with the second epicyclic geartrain.

12. The method of claim 11, further comprising: determining a first motor power provided to the first motor and a second motor power provided to the second motor for an engine off operating case with the ECU.

13. The method of claim 12, further comprising: determining a power loss of the battery for the engine off operating case with the ECU.

14. The method of claim 11, wherein the desired engine operating case is determined by the ECU to have a lowest power consumption compared to the plurality of engine operating cases.

15. The method of claim 11, further comprising: applying a state bias with the ECU to one of: the engine off operating case and a local engine operating case having a lowest power consumption based on a current operating state of the vehicle.

16. The method of claim 15, wherein the state bias comprises a predetermined value representing a perceived inconvenience associated with stopping or restarting the combustion reaction.

17. The method of claim 11, further comprising: determining the amount of torque to be provided to each of the first side of the vehicle and the second side of the vehicle with the ECU using planetary gearset equations.

18. The method of claim 11, determining, with the ECU, the amount of power to be provided to each of the first side of the vehicle and the second side of the vehicle based upon a steering force value received from a steering wheel position sensor.

19. The method of claim 11, further comprising: refining the global search window to a local search window with the ECU and repeating the search for a plurality of local engine operating cases occupying the local search window.

20. The method of claim 19, further comprising: performing the search in the global window and the search in the local window on a Brake Specific Power Consumption (BSFC) power line such that each of the engine operating cases is uniquely associated with a torque value and a speed value.

* * * * *